United States Patent
Leister et al.

(10) Patent No.: US 11,835,721 B2
(45) Date of Patent: Dec. 5, 2023

(54) DISPLAY DEVICE AND METHOD FOR PRODUCING A LARGE FIELD OF VISION

(71) Applicant: SEEREAL TECHNOLOGIES S.A., Munsbach (LU)

(72) Inventors: Norbert Leister, Dresden (DE); Bo Kroll, London (GB)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 547 days.

(21) Appl. No.: 16/757,483

(22) PCT Filed: Oct. 17, 2018

(86) PCT No.: PCT/EP2018/078367
§ 371 (c)(1),
(2) Date: Apr. 20, 2020

(87) PCT Pub. No.: WO2019/076963
PCT Pub. Date: Apr. 25, 2019

(65) Prior Publication Data
US 2021/0191123 A1    Jun. 24, 2021

(30) Foreign Application Priority Data

Oct. 18, 2017    (EP) .................................... 17197171

(51) Int. Cl.
*G03H 1/00*        (2006.01)
*G02B 27/01*       (2006.01)
(Continued)

(52) U.S. Cl.
CPC ..... *G02B 27/0172* (2013.01); *G02B 27/0093* (2013.01); *H04N 13/339* (2018.05);
(Continued)

(58) Field of Classification Search
CPC ............ G02B 27/0172; G02B 27/0093; H04N 13/383; H04N 13/339
(Continued)

(56) References Cited

U.S. PATENT DOCUMENTS 9,406,166 B2    8/2016  Futterer
2001/0019434 A1*  9/2001  Popovich .......... G02F 1/133621
                                                        359/24
(Continued)

FOREIGN PATENT DOCUMENTS

WO    2010149587 A2    12/2010
WO    2012062681 A1    5/2012
(Continued)

OTHER PUBLICATIONS

International Search Report, dated Jan. 8, 2019, and Written Opinion issued in International Application No. PCT/EP2018/078367).

*Primary Examiner* — Jonathan M Blancha
(74) *Attorney, Agent, or Firm* — Saul Ewing LLP

(57) ABSTRACT

The invention relates to a display device for representing two-dimensional and/or three-dimensional objects or scenes. The display device comprises at least one illumination device for emitting sufficiently coherent light, at least one spatial light modulation device for modulating incident light, and at least one optical system. The at least one optical system is provided for multiple imaging of the at least one spatial light modulation device and for generating virtual viewing windows in accordance with the number of images of the at least one spatial light modulation device. The individual images of the at least one spatial light modulation device are combined with one another as segments and form a field of view. The field of view comprises at least one high-resolution holographic segment and at least one low-resolution holographic segment.

31 Claims, 10 Drawing Sheets

(51) Int. Cl.
*H04N 13/383* (2018.01)
*H04N 13/339* (2018.01)
*G02B 27/00* (2006.01)

(52) U.S. Cl.
CPC ... *H04N 13/383* (2018.05); *G02B 2027/0109* (2013.01); *G02B 2027/0145* (2013.01); *G02B 2027/0147* (2013.01); *G02B 2027/0174* (2013.01)

(58) Field of Classification Search
USPC .......................................................... 359/13
See application file for complete search history.

(56) References Cited

U.S. PATENT DOCUMENTS

| | | | |
|---|---|---|---|
| 2010/0289870 A1* | 11/2010 | Leister | G03H 1/2286 348/E13.001 |
| 2013/0222384 A1 | 8/2013 | Futterer | |
| 2014/0055692 A1 | 2/2014 | Kroll et al. | |
| 2016/0062121 A1* | 3/2016 | Border | G02B 27/0176 359/630 |
| 2016/0187654 A1* | 6/2016 | Border | G02B 27/0172 359/630 |
| 2016/0231566 A1 | 8/2016 | Levola et al. | |
| 2016/0278695 A1 | 9/2016 | Wang et al. | |
| 2017/0285343 A1* | 10/2017 | Belenkii | H04N 13/344 |
| 2017/0299870 A1* | 10/2017 | Urey | G02B 5/0242 |
| 2018/0164592 A1* | 6/2018 | Lopes | A61B 3/0041 |
| 2018/0364643 A1 | 12/2018 | Kroll et al. | |
| 2019/0285897 A1* | 9/2019 | Topliss | G02B 27/0176 |

FOREIGN PATENT DOCUMENTS

| | | |
|---|---|---|
| WO | 2016156287 A1 | 10/2016 |
| WO | 2018037077 A2 | 3/2018 |
| WO | 2018146326 A2 | 8/2018 |
| WO | 2019012028 A1 | 1/2019 |

* cited by examiner

DISPLAY DEVICE AND METHOD FOR PRODUCING A LARGE FIELD OF VISION

CROSS REFERENCE TO RELATED APPLICATIONS

This application claims the priority of PCT/EP2018/078367, filed on Oct. 17, 2018, which claims priority to European Application No. EP 17197171.6, filed on Oct. 18, 2017, the entire contents of each of which are incorporated fully herein by reference.

BACKGROUND OF THE INVENTION

The invention relates to a display device for representing two-dimensional and/or three-dimensional objects or scenes. Furthermore, the invention also relates to a method for generating a large field of view by means of such a display device.

In a two-dimensional or three-dimensional display, or display device, for good user convenience it is particularly advantageous to generate a large field of view, or a large viewing angle.

In a holographic display, however, a large field of view generally requires a very large number of pixels in a spatial light modulation device, or optionally a very high frame rate of the spatial light modulation device when different regions of the field of view are intended to be represented in chronological succession.

For display devices, or displays, which, in connection with the representation of an object or a scene, generate a virtual viewing window through which a represented scene or object may be observed, this means: in order for example to generate a 7 mm large virtual viewing window or visibility region for blue light with the wavelength 460 nm, for example approximately 250 complex-valued pixels per degree of field of view or viewing angle are required in the spatial light modulation device. Even with a high-resolution, only phase-modulating spatial light modulation device having 4000×2000 pixels, and with the assumption that each two phase pixels are combined to form a complex-valued macropixel, there are therefore about 2000×2000 complex-valued macropixels, only a field of view of 8 degrees vertically×8 degrees horizontally can be generated.

A holographic display device is based, inter alia, on the effect of diffraction at the apertures of the pixels of the spatial light modulation device and interference of coherent light, which is emitted by a light source. Some important conditions for a holographic display device that generates a virtual viewing window may, however, be formulated and defined with geometrical optics.

On the one hand, the illumination beam path in the display device is important in this case. It is used, inter alia, to generate a virtual viewing window. A spatial light modulation device is illuminated by means of an illumination device, which comprises at least one real or virtual light source. The light coming from the different pixels of the spatial light modulator must then respectively be directed into the virtual viewing window. To this end, the at least one light source of the illumination device which illuminates the spatial light modulation device is usually imaged into an observer plane comprising the virtual viewing window. This imaging of the light source is carried out, for example, at the center of the virtual viewing window. In the case of illuminating a spatial light modulation device with a plane wave, which corresponds to a light source at infinity, for example light, from different pixels of the spatial light modulation device, which emerges perpendicularly from these pixels, is focused into the middle of the virtual viewing window. Light which emerges from different pixels of the spatial light modulation device not perpendicularly but respectively at the same diffraction angle is then likewise focused respectively at the same position in the virtual viewing window. In general, however, the virtual viewing window may also be displaced laterally relative to the image of the at least one light source, and for example the position of the image of the at least one light source may coincide with the left or right edge of the viewing window.

On the other hand, in a holographic display device, except in a direct-view display, the imaging beam path is important. In a head-mounted display (HMD), in general a magnified image of a spatial light modulation device which is small in its extent is generated. Often, this is a virtual image which the observer sees at a distance greater than the distance at which the spatial light modulation device itself is located. The individual pixels of the spatial light modulation device are usually imaged on an enlarged scale.

A holographic direct-view display, which generates a virtual viewing window, has an illumination beam path. The display comprises an illumination device having at least one light source. For example, the illumination device is configured as a backlight which generates a collimated plane wavefront that illuminates the spatial light modulation device. The collimated wavefront corresponds to a virtual light source, which illuminates the spatial light modulation device from an infinite distance. The spatial light modulation device may, however, also be illuminated with a divergent or convergent wavefront, which corresponds to a real or virtual light source at a finite distance in front of or behind the spatial light modulation device. A field lens focuses the light coming from the spatial light modulation device onto the position of a virtual viewing window. If a hologram is not written into the spatial light modulation device, an image of the light source and the periodic repetitions of this image as higher diffraction orders are formed in the observer plane. If a suitable hologram is written into the spatial light modulation device, a virtual viewing window is formed close to the zeroth diffraction order. This is described below as the virtual viewing window being located in a plane of the light source image. In a holographic direct-view display, the field lens which generates an image of the light source is usually located close to the spatial light modulation device. An observer sees the spatial light modulation device at its actual distance, without imaging of the spatial light modulation device taking place. There is then no imaging beam path.

In other holographic display devices, for example head-mounted displays (HMDs), head-up displays (HUDs) or other projection displays, there may additionally be an imaging beam path, as already briefly mentioned. In these display devices, a real or virtual image of the spatial light modulation device is generated, the observer seeing this image, the illumination beam path for generating a virtual viewing window furthermore being important. Both beam paths, the illumination beam path and the imaging beam path, are therefore important in this case.

In other display devices as well, for example stereoscopic display devices, the case may arise that there are an imaging beam path and an illumination beam path. A stereoscopic display device for generating a sweet spot may for example comprise an optical arrangement similar to that of the aforementioned holographic display devices, i.e. collimated illumination of a spatial light modulation device and a field lens, but also additional components, for example a scattering element having a defined scattering angle. If the scattering element were taken out of the display device, the field lens would generate a light source image in the plane of the sweet spot. By using the scattering element, the light is instead distributed over an extended sweet spot, which is narrower than the interpupillary distance of an observer. The illumination beam path is, however, important in order to be able to see the stereoscopic image fully without vignetting effects. A three-dimensional stereo display device may in this case likewise have an imaging beam path, with which a spatial light modulation device is imaged at a particular distance from the observer.

In holographic display devices, the typical size of subholograms in the calculation of a hologram from a three-dimensional scene is dependent on the location of the three-dimensional scene in space relative to the plane, or image plane, of the spatial light modulation device. Subholograms that are large in their extent occur, for example, when a scene for the observer lies far in front of the plane, or image plane, of the spatial light modulation device. Large subholograms, however, increase the computational effort during the hologram calculation. In WO 2016/156287 A1 in the name of the Applicant, a method is disclosed by which the computational effort is reduced by computed introduction of a virtual plane of the spatial light modulation device. As an alternative, however, it would also be desirable to select an optical system in such a way that the image plane of the spatial light modulation device is formed at a favorable position, so that the hologram can be calculated with subholograms that are small in their extent.

In one alternative configuration of a holographic display device that generates a virtual viewing window, imaging of a spatial light modulation device into the virtual observer plane may also take place. To this end a kind of screen, or alternatively a reference plane if a physical screen is not present, is provided for a holographic representation of a three-dimensional scene in a Fourier plane of the spatial light modulation device, i.e. the image plane of a light source. In such a display device, there are therefore likewise an imaging beam path and an illumination beam path. However, their importance for the hologram plane and the observer plane is interchanged. The virtual viewing window is then located in an image plane of the spatial light modulation device, and is therefore connected with the imaging beam path. The hologram, or the reference plane for calculating the hologram from the three-dimensional scene, is located in a Fourier plane of the spatial light modulation device, and is therefore connected with the illumination beam path.

If a suitably calculated hologram is written into the spatial light modulation device and the display device comprises an illumination device which generates sufficiently coherent light, a two-dimensional image is generated in a Fourier plane of the spatial light modulation device as a Fourier transform of the hologram. An additional scattering element may be located in this plane. If an image of the spatial light modulation device would be generated in the observer plane without the scattering element, a sweet spot would be formed instead with the scattering element. The size of the sweet spot in this case depends on the scattering angle of the scattering element. Such an arrangement may, for example, be used in a head-up display (HUD).

The explanations below are primarily intended to relate to the case in which there is the virtual viewing window or a sweet spot in the plane of the light source image. The comments made are, however, by respective interchanging of the imaging beam path and the illumination beam path, or the plane of the spatial light modulation device and the Fourier plane, also applicable to embodiments with imaging of the spatial light modulation device into the virtual viewing window. The present invention is therefore not intended to be restricted to the case with a virtual viewing window or sweet spot in the plane of the light source image.

In WO 2012/062681 A1, a holographic display having a virtual viewing window is disclosed. A segmented representation of the field of view is described. This field of view may be enlarged by representing a plurality of segments of the field of view in chronological succession by means of a spatial light modulator and a suitable optical system. A scene or an object may be represented inside this segmented field of view, which is then visible from a virtual viewing window. Time-sequential generation of the individual segments, however, increases the requirement for the frame rate of the spatial light modulation device.

At the center of the retina, in the fovea, of the human eye, a human or a person can typically achieve a visible angular resolution of 1 minute of arc. The letter "E" is, for example, perceived by a human having 100% eyesight when it is 5 minutes of arc in size, the three bars (dark regions) of the letter "E" respectively occupying one minute of arc and the two intermediate spaces (light regions) of the letter "E" also respectively occupying one minute of arc. A resolution of 60 pixels per degree of a field of view, or 30 cycles per degree of a field of view, each cycle respectively consisting of a neighboring black point and white point, thus corresponds to the human resolution power. In the peripheral regions of the retina, however, the resolution is much less.

The resolution power of the retina of the human eye is therefore high only in a small angle range. This fact is for example already used for "foveated rendering", which is a graphic rendering technique that uses an eye tracking system in order to reduce the workload during the rendering, by reducing the image quality in the peripheral field of view, i.e. calculation is carried out with full resolution only in the region in the middle of the image, while regions at the edge of the image are calculated with a low resolution. This therefore means that, for the representation of a scene, it is calculated with high resolution only where the eye of an observer is looking at this instant, and it is calculated with a lower resolution outside the central field of view.

To this end, for example, by means of gaze tracking it is possible to detect where an observer is respectively looking. Such "foveated rendering" is also usable for the calculation of holograms. However, it advantageously affects only the required computing power, but not the required number of pixels or the required frame rate of a spatial light modulation device being used.

In WO 2012/062681 A1, for example, it is also described that in a holographic head-mounted display (HMD) having a segmented or tiled representation of parts of the viewing angle, or field of view, a holographic representation and a stereoscopic representation may also be combined. Tiling, which is referred to as segmented multiple imaging, of the field of view is in this case carried out in a holographic HMD, in one embodiment one part of the segments being generated holographically and another part of the segments being generated stereoscopically. In this regard, the following is disclosed, "A refined embodiment—of the temporally and/or spatially segmental provision of the image contents in an extended observer space—represents a combination, variable in solid angle, of an incoherent 2D representation and/or of a stereo 3D representation, with a dynamically encoded, at least partially coherent holographic 3D representation. In one simple embodiment for example—only the vertical observer angle will be considered in this case for the sake of simplicity of the representation—the central angle range of (0 to ±13)°, i.e. 26° deg, which corresponds to a central segment of the SLM in the field lens plane, are generated by means of dynamically encoded holographic 3D representation. The angle ranges of from +13 to +39° deg and from −13 to −39° deg lying above and below the central angle range may be generated by means of 2D or 3D stereo representation. The rationale is that, within their natural environment, the user can only see a limited solid angle with high resolution and highly perceptible 3D impression. If a very large solid angle is available to the user, the features of high resolution and highly perceptible 3D impression are present only in a subregion of the overall solid angle. This is the region on which the user may concentrate. Since this region may move in space with the eye movement of the user, it is advantageous likewise to make the spatial region represented with strong focal and 3D features move. To this end, detection of the eye positions and/or the gaze direction is to be provided."

One substantial problem of stereoscopic three-dimensional (3D) representation is the vergence-accommodation conflict. The vergence-accommodation conflict occurs in particular, in the case of stereoscopic display devices, or displays, when an observer focuses on the display surface, or on the surface of the spatial light modulation device, so that they can perceive it clearly. The disparity of the two stereoscopic images represented suggests three-dimensional objects which are to be seen in front of or behind the display surface. In this case, the eyes converge on the apparent distance of these objects from the display surface. The object is thereby fixated and should be perceived clearly. However, the object is not actually located at a distance from the display surface, so that the observer then no longer sees the object clearly when they fixate it. Observers therefore very often experience headaches or other kinds of discomfort when observing stereoscopic scenes or objects. These negative effects may, however, be overcome when using holographic display devices, or displays.

Since the perceptible depth resolution is also reduced with a decreasing lateral resolution, a vergence-accommodation conflict occurs most greatly for those regions of a scene which an observer perceives with high resolution in a central region on the fovea. The eye can still perceive depth even outside the central region of the fovea, but with a lower depth resolution. In the peripheral field of view far away from the center of the fovea, however, only two-dimensional vision is still possible.

If the region of the viewing angle, or of the field of view, of a three-dimensional scene in the gaze direction of the eye, which therefore strikes the retina at the center of the fovea, is holographically represented, and a region of the viewing angle which is perceived away from the center of the fovea with lower resolution is represented stereoscopically, a possible vergence-accommodation conflict is reduced in comparison with purely stereoscopic representation. The vergence-accommodation conflict can, however, only be completely avoided if the holographic fraction of the viewing angle, or of the field of view, is sufficiently large so that stereo representation takes place only in the region of the viewing angle with a lack of depth information. The region of the viewing angle which would have to be represented holographically is to this end approximately 30 degrees, and is therefore similar to the holographic region specified in WO 2012/062681 A1 as a numerical example of 26 degrees. As already described, for example a spatial light modulator having 2000×2000 complex-valued macropixels in an individual segment would approximately generate a field of view of only 8 degrees vertically×8 degrees.

In WO 2012/062681 A1 inter alia possibilities are also described of using two different light modulators for the generation of stereoscopic and holographic segments.

In WO 2018/146326 A2, a holographic head-mounted display is described which uses a curved light guiding device that likewise allows the combination of holographic and stereoscopic segments, which are generated either with the same spatial light modulation device or with two different spatial light modulation devices. By means of gaze tracking and tracking of the viewing angle portion, or of the field of view portion, of the at least one holographic segment to the gaze position of the observer, and by generating a large viewing angle, or a large field of view, with a stereoscopic segment, an overall large viewing angle, or a large field of view, is generated, the generation being carried out with lower requirements for the spatial light modulation device than in the case of a conventional purely holographic representation.

WO 2018/146326 A2, however, could have the following disadvantages: if the entire angle range within which the human eye still has a significant depth resolution is intended to be represented holographically in the conventional way, in order to fully avoid a possible vergence-accommodation conflict, a relatively large number of pixels in the spatial light modulation device, or a relatively large number of time-sequentially generated segments, are still required.

A numerical example in WO 2012/062681 A1 mentions, for example, a central angular range of 26° vertically, which is represented holographically. In the example of 250 pixels per degree mentioned, this would correspond to a number of approximately 6500 complex-valued macropixels in the spatial light modulation device, or approximately three to four sequentially represented segments for a spatial light modulation device having 2000 complex-valued macropixels in the spatial light modulation device. For a 26 degrees vertically×26 degrees horizontally viewing angle, or field of view, this would correspondingly give from nine to sixteen segments. This would correspond to a very high computational and representation effort.

SUMMARY OF THE INVENTION

It is therefore an object of the present invention to provide a display device which makes it possible to generate a large field of view with simple means and without a high computational effort and time required. This is preferably intended to be achievable in combination with segmented imaging of a spatial light modulation device. In particular, a display device is intended to be provided which is adapted even better than the display device of WO 2018/146326 A2 to a decreasing lateral resolution of the retina of the human eye with a reduced but still existing depth resolution, and which contributes to a further reduction of the requirement for the pixel number in the spatial light modulation device or the frame rate and to a further improvement of the user convenience in a display device, or a display.

This object is achieved according to the invention by a display device having the features of the claims.

According to the invention, a display device is provided which is particularly suitable for use in near-to-eye displays, and in this case particularly in head-mounted displays, although use is not intended to be restricted to these displays, or display devices. The display device could, for example, also be used in future head-up displays which have a large field of view than hitherto commercially available head-up displays.

Such a display device according to the invention for representing two-dimensional and/or three-dimensional objects or scenes comprises at least one illumination device for emitting sufficiently coherent light, at least one spatial light modulation device for modulating incident light, and at least one optical system. The at least one optical system is provided for multiple imaging of the at least one spatial light modulation device and for generating virtual viewing windows in accordance with the number of images of the at least one spatial light modulation device. The individual images of the at least one spatial light modulation device are combined with one another as segments and form a field of view. The field of view comprises at least one high-resolution holographic segment and at least one low-resolution holographic segment.

According to the invention, therefore, in order to generate a large viewing angle, or a large field of view, by using a segmented representation of the field of view, at least one high-resolution holographic segment is provided in combination with at least one low-resolution holographic segment. In this way, a reduced pixel number and/or a reduced frame rate of the spatial light modulation device in a holographic display device may be used in comparison with display devices already known in the prior art. Furthermore, by the segmented generation and representation of the field of view, by means of a combination of the individual segments with one another it is possible to generate a large field of view, inside which a three-dimensional scene or object can be observed by an observer. To this end, the observer observes the three-dimensional scene through a virtual viewing window. This means that a virtual viewing window is generated during the generation of each individual segment for a large field of view, all the viewing windows for an eye of the observer being intended to be formed at one position in an observer plane and superimposed with one another.

One or more segments of the field of view of a three-dimensional scene, which are intended to lie in the gaze direction of the eye of an observer, or could be found there after the generation of the entire field of view, and therefore strike the retina at the center of the fovea, are high-resolution holographically generated and represented, i.e. with a very high resolution. In the context of this application, a segment is referred to as high-resolution when the resolution, i.e. the object points per degree of field of view, the field of view being determined from a virtual viewing window, almost reaches or fully reaches or exceeds the eye resolution of an observer at the center of the retina of 60 pixels/object points per degree of field of view, in particular when the resolution is greater than or equal to 50 pixels/object points per degree of field of view. 50 pixels/object points per degree of field of view would be the case when the required resolution for the high-resolution holographic segment almost reaches but does not quite reach the eye resolution.

However, one or more said segments of the field of view of the same three-dimensional scene, which are not intended to lie in the gaze direction of the eye of an observer, or could be found there after the generation of the entire field of view, and therefore strike the retina but not at the center of the fovea, are low-resolution holographically generated and represented, i.e. with a low resolution. In the context of this application, a segment is referred to as low-resolution when the resolution, i.e. the object points per degree of field of view, the field of view being determined from a virtual viewing window, falls significantly below the eye resolution of an observer, in particular when the resolution is less than or equal to 40 pixels/object points per degree of field of view, for example in the range of between 40 pixels/object points per degree of field of view to less than 5 pixels/object points per degree of field of view, but is not intended to be restricted to this lower value of 5 pixels/object points.

For example, a large field of view, or a large viewing angle, of 50 degrees horizontally times 50 degrees vertically may be generated by a combination of a high-resolution holographic segment with a size of about 8×8 degrees and a low-resolution holographic segment with a size of about 50×50 degrees. The high-resolution holographic segment is then respectively located inside the low-resolution holographic segment. The size of the viewing angle of the segments is not restricted to the numerical values mentioned by way of example. For example, the horizontal viewing angle and the vertical viewing angle of a segment may differ. The at least one low-resolution holographic segment may, for example, also have a size of 60×30 degrees. The high-resolution holographic segment may have a maximum size of the viewing angle of about 10×10 degrees. The low-resolution holographic segment may have a maximum size of the viewing angle of about 100×100 degrees.

With the display device according to the invention, a more realistic depth representation of the reconstructed object points may advantageously be achieved in comparison with generation of a stereoscopic segment for objects of a three-dimensional scene which do not lie in the gaze direction of the eye of an observer, even for the at least one low-resolution holographic segment. In this way, a possible vergence-accommodation conflict is substantially reduced or completely avoided since the viewing angle, or the field of view, is generated purely holographically.

Further advantageous configurations and refinements of the invention may be found in the other dependent claims.

In one particularly advantageous configuration of the invention it can be provided that the at least one optical system may be provided for generating at least one virtual viewing window in combination with the generation of the at least one high-resolution holographic segment, the size of the virtual viewing window of the at least one high-resolution holographic segment being equal to or greater than the size of an eye pupil of an observer observing the object or the scene in the field of view.

Typical eye pupil sizes of the human eye lie in the range of from approximately 2.5 mm to 6 mm. Preferably, the size of the at least one virtual viewing window of the at least one high-resolution holographic segment may be selected from a range of from about 6 mm to about 15 mm.

In another particularly advantageous embodiment of the invention it can be provided that the at least one optical system may be provided for generating at least one virtual viewing window in combination with the generation of the at least one low-resolution holographic segment, the size of the virtual viewing window of the at least one low-resolution holographic segment being less than the size of an eye pupil of an observer observing the object or the scene in the field of view.

The low-resolution holographic segment is in this case generated by a virtual viewing window which is smaller than an eye pupil of an observer. Preferably, the size of the at least one virtual viewing window of the at least one low-resolution holographic segment is selected in a range of from about 0.5 mm to about 2 mm.

Advantageously, not only the computational effort of a hologram to be encoded into the spatial light modulation device but also the required number of pixels of the spatial light modulation device, which are required in order to generate a particular viewing angle, are reduced by a low-resolution holographic segment, having a virtual observation window whose size is smaller than the eye pupil of an observer.

It may also be advantageous for a plurality of low-resolution holographic segments and/or a plurality of high-resolution holographic segments to comprise virtual viewing windows of different size.

It is therefore possible that a plurality of high-resolution holographic segments, but in particular a plurality of low-resolution holographic segments having a virtual viewing window of different size may also be used. For example, a low-resolution holographic segment having a virtual viewing window with a size of about 0.5 mm and a low-resolution holographic segment having a virtual viewing window with a size of about 2 mm could be provided and generated. In principle, however, a plurality of high-resolution holographic segments having a virtual viewing window of different size may also be used in an observer plane. The size of the individual virtual viewing windows for the high-resolution holographic segments advantageously lies in a range of from about 6 mm to about 15 mm.

Furthermore, it is also possible for a plurality of low-resolution holographic segments with virtual viewing windows differing in their size to be combined and provided with a plurality of high-resolution holographic segments with virtual viewing windows differing in their size.

By the size of the virtual viewing window, a different value for the required pixels per degree of field of view of a spatial light modulation device is obtained for each high-resolution holographic segment and for each low-resolution holographic segment.

By a suitably configured optical system, which provides imaging of at least one spatial light modulation device, the number of pixels per degree of field of view may be suitably defined, selected and adjusted. The optical system should in this case provide a correspondingly defined distance of the image of the spatial light modulation device to the virtual viewing window in the observer plane and a predefined magnification of the image of the spatial light modulation device.

The generation of the virtual viewing window of the at least one low-resolution holographic segment and of the virtual viewing window of the at least one high-resolution holographic segment in an observer plane may advantageously be provided at the same position.

Furthermore, an at least partial overlap of the virtual viewing window of the at least one low-resolution holographic segment with the virtual viewing window of the at least one high-resolution holographic segment may be provided.

In one embodiment of the invention, different spatial light modulation devices may be used in order to generate the at least one high-resolution holographic segment and the at least one low-resolution holographic segment. To this end, at least two spatial light modulation devices may be provided, one spatial light modulation device being provided for generating the at least one high-resolution holographic segment and the other spatial light modulation device being provided for generating the at least one low-resolution holographic segment.

The one spatial light modulation device for generating the at least one high-resolution holographic segment and the other spatial light modulation device for generating the at least one low-resolution holographic segment may in this case be configured differently. For example, the two spatial light modulation devices may comprise pixels of different sizes, a different number of pixels or a different aspect ratio. A spatial light modulation device for generating the at least one high-resolution holographic segment may, for example, comprise a square arrangement of 2000×2000 complex-valued pixels in order to generate an observation angle of 8×8 degrees. A spatial light modulation device for generating the at least one low-resolution holographic segment may, for example, comprise a rectangular arrangement of 1000×500 complex-valued pixels in the aspect ratio of 2:1 and generate a viewing angle of 60×30 degrees.

In one alternative preferred embodiment, the same spatial light modulation device is used for the at least one high-resolution holographic segment and the at least one low-resolution holographic segment.

According to another advantageous configuration of the invention it can be provided that the optical system may comprise at least one switchable or controllable element.

The optical system is configured in such a way that it comprises at least one switchable or controllable element or component. With the at least one switchable or controllable element in the optical system, the size of the virtual viewing window to be generated may be selected and adjusted during the generation of a corresponding high-resolution holographic segment or a low-resolution holographic segment or the number of pixels per degree of field of view. In this way, with simple means it is possible to select the generation of at least one high-resolution holographic segment or at least one low-resolution holographic segment. To this end, the at least one switchable or controllable element may be switched or controlled according to a high-resolution holographic segment to be generated or a low-resolution holographic segment.

In one particularly advantageous configuration of the invention it can be provided that the optical system may comprise two switchable or controllable optical elements, a first switchable or controllable optical element being switchable or controllable in order to generate the at least one high-resolution holographic segment and a second switchable or controllable optical element being switchable or controllable in order to generate the at least one low-resolution holographic segment.

The at least one switchable or controllable element in the at least one optical system may be configured as a lens element or as a mirror element, or as a grating element, which deflect the incident light differently according to the switching state. Lens elements may optionally be configured to be refractive or diffractive. The at least one switchable or controllable element in the optical system may also be configured as a polarization switch in combination with passive polarization-selective elements, for example polarization-selective lens elements or wire grid polarizers, which act as polarization-selective mirrors, or passive grating elements which deflect light differently according to the polarization state. This at least one switchable or controllable element may be arranged in the beam path of the display device according to the invention, as seen in the light propagation direction, between the at least one spatial light modulation device and an observer plane, in which the at least one virtual viewing window and an eye of an observer are located.

Advantageously, a hologram in the form of single-parallax encoding may furthermore be written into the at least one spatial light modulation device in order to generate the at least one high-resolution holographic segment and the at least one low-resolution holographic segment.

A hologram in the form of single-parallax encoding may also be written into the at least one spatial light modulation device for the holographic segments, in particular, however, for the at least one low-resolution holographic segment. In this way, a virtual viewing window is generated in one dimension or direction, i.e. in the encoding direction of the hologram in the spatial light modulation device, and a sweet spot is generated in the dimension or direction perpendicular thereto, i.e. the non-encoding direction of the hologram. It is therefore possible that the sweet spot may also be larger in size for the at least one low-resolution holographic segment than the typical eye pupil of an observer. For example, the region of the sweet spot in the observer plane may have an extent of about 10 mm, while the region of the virtual viewing window may have an extent of about 1 mm.

If the same spatial light modulation device is used for the generation of the low-resolution holographic segment and for the generation of the high-resolution holographic segment, these segments are generated time-sequentially, i.e. in succession.

If, however, two spatial light modulation devices are used, i.e. one spatial light modulation device for the generation of the at least one low-resolution holographic segment and a further spatial light modulation device for the generation of the at least one high-resolution holographic segment, the segments may be generated simultaneously, i.e. at the same time.

In one alternative advantageous configuration of the invention it can be provided that a hologram in the form of full-parallax encoding may be written into the at least one spatial light modulation device in order to generate the at least one high-resolution holographic segment, and a hologram in the form of single-parallax encoding may be written into the at least one spatial light modulation device in order to generate the at least one low-resolution holographic segment.

Therefore, full-parallax encoding of the hologram is used for the generation of the at least one high-resolution holographic segment and single-parallax encoding of the hologram is used for the generation of the at least one low-resolution holographic segment.

In this case as well, the same spatial light modulation device may be used for the generation of the low-resolution holographic segment and for the generation of the high-resolution holographic segment, although these segments are written into the spatial light modulation device by different encoding and then generated time-sequentially.

It is, however, again possible to use two spatial light modulation devices, i.e. one spatial light modulation device for the generation of the at least one low-resolution holographic segment and a further spatial light modulator for the generation of the at least one high-resolution holographic segment, a hologram respectively being written into the two spatial light modulation devices by different encoding and these segments then being generated simultaneously.

At least one filter arrangement may furthermore advantageously be provided for eliminating higher diffraction orders present in the observer plane.

In particular for the at least one low-resolution holographic segment, provision may be made to filter out light of higher diffraction orders so that this light cannot reach the eye pupil of an observer of a three-dimensional scene in the field of view. This avoids undesirable double images of the holographic reconstruction, or of the holographically reconstructed scene or object, being visible for the eye. In addition, however, provision may also be made that light of all or only particular higher diffraction orders is filtered out with the same or with an additional filter arrangement for the at least one high-resolution holographic segment as well.

For a virtual viewing window of the at least one high-resolution holographic segment which is larger than the typical size of an eye pupil, this light would not normally strike the eye directly.

Filtering may, however, reduce possibly occurring undesired perturbing effects in the optical system, for example undesired reflections at lens surfaces, etc. Alternatively, filtering facilitates the use of optical elements, for example volume gratings, which have only a particular angle of acceptance.

A gaze-tracking device and at least one tracking device may advantageously be provided in the display device according to the invention. The gaze-tracking device may in this case be provided for detecting the pupil position in the eye and to track a gaze of an observer observing the object or the scene.

The at least one tracking device may be provided for following the virtual viewing window of the at least one high-resolution holographic segment and/or for following the virtual viewing window of the at least one low-resolution holographic segment, and may therefore especially be configured as a viewing window tracking device.

At least one device may furthermore be provided for adapting the position i.e. the distance from the visual viewing window of an image of the at least one spatial light modulation device or the position, here the viewing angular range in the field of view, of the at least one high-resolution holographic segment and/or of the at least one low-resolution holographic segment to a focal position and gaze direction of an eye of the observer which are determined by means of the gaze-tracking device, and may therefore especially be configured as a gaze-tracking device.

It is furthermore possible and even preferred for the display device according to the invention to comprise two tracking devices, namely a viewing window tracking device and a gaze-tracking device.

In the gaze-tracking device, at least one diffraction grating having a variable grating period may for example be used, as is described for example in WO 2010/149587 A2. By writing a lens function into the at least one diffraction grating, for example, the distance of an image of the at least one spatial light modulation device to the virtual viewing window may be displaced. By writing a prism function into the at least one diffraction grating, for example, the viewing angular range in the field of view of the at least one high-resolution holographic segment and/or of the at least one low-resolution holographic segment may be displaced.

A gaze-tracking device may be arranged in the display device according to the invention, for example in a Fourier plane of the spatial light modulation device. The invention is not, however, intended to be restricted to this position of the gaze-tracking device in the display device so that other positions in the display device are also possible.

Preferably, observer tracking is carried out by means of a viewing window tracking device, by the virtual viewing window both of the at least one high-resolution holographic segment and of the at least one low-resolution holographic segment being made to follow the eye position of the observer of the three-dimensional scene when the eye or the observer moves to a different position. This tracking of the individual segments of the field of view may be carried out in various ways. For example, as described for example in WO 2018/037077 A2, a plurality of diffraction orders may be used for the at least one high-resolution holographic segment and a displacement of the virtual viewing window may be used by means of encoding of prism terms and prism functions into the at least one spatial light modulation device inside these diffraction orders. For example, in a different configuration, diffraction gratings having a variable grating period may likewise be used, as are described in WO 2010/149587 A2.

For example, the at least one diffraction grating for tracking the virtual viewing window may be arranged in an image plane of the at least one spatial light modulation device. The invention is not, however, intended to be restricted to this position, but rather other positions are likewise possible.

In another embodiment of the invention, however, at least two diffraction gratings may also be used, which carry out a combination of viewing window tracking and gaze-tracking.

The present invention is not, however, intended to be restricted to a particular type of tracking.

In another particularly advantageous embodiment of the invention it can be provided that the field of view comprises the at least one high-resolution holographic segment, the at least one low-resolution holographic segment and at least one stereoscopic segment.

The at least one high-resolution holographic segment and the at least one low-resolution holographic segment may therefore be combined with at least one stereoscopic segment in the field of view. This means that, in addition to the at least one high-resolution holographic segment and the at least one low-resolution holographic segment, at least one stereoscopic segment is generated. This at least one stereoscopic segment is generated in lateral regions of the field of view, regions in which an observer perceives the represented scene only with low resolution and with greatly reduced or even no longer existing depth resolution, i.e. there is scarcely any or no three-dimensional impression of the scene or of the object. This at least one stereoscopic segment is configured as a fixed segment in the field of view. This means that the stereoscopic segment is not displaced to a different position in the field of view by means of the tracking device.

For example, a large field of view or a large viewing angle of 120 degrees horizontally by 50 degrees vertically may be generated by a combination of a high-resolution holographic segment having a size of about 8×8 degrees, a low-resolution holographic segment having a size of about 50×50 degrees and a fixed and therefore non-displaceable stereoscopic segment having a size of about 120×50 degrees. The high-resolution holographic segment may be displaced by means of at least one gaze-tracking device inside the field of view in a range of about ±25 degrees in the horizontal direction and/or in the vertical direction. The low-resolution holographic segment may likewise be displaced in the horizontal direction inside the field of view in a range of about ±25 degrees, but is provided fixed, i.e. non-displaceably, in the vertical direction.

The at least one high-resolution holographic segment is then located inside the generated and represented low-resolution holographic segment. This relates to the general representation of both of these segments for the generation of a large field of view.

If at least one stereoscopic segment is also generated in addition and the field of view is further increased in this way, the at least one high-resolution holographic segment and the at least one low-resolution holographic segment are located inside the additionally generated and represented stereoscopic segment.

It may therefore be advantageous for the at least one high-resolution holographic segment, the at least one low-resolution holographic segment and the at least one stereoscopic segment to be arranged partially or fully overlapping in the field of view.

The individual segments, i.e. the low resolution holographic segment and the high-resolution holographic segment, and, if a stereoscopic segment is also intended to be generated in addition, then this stereoscopic segment as well, may optionally partly or fully overlap with one another in the field of view. In particular, the segments that are generated to be smaller in their size may be fully contained in the segments that are generated to be larger in their size, and displaced by means of the tracking device. This relates to both high-resolution holographic segments and to low-resolution holographic segments and, when present, also stereoscopic segments.

Furthermore, in one advantageous configuration of the invention, at least one light guiding device may be provided, which comprises a light guide, at least one light coupling device and at least one light decoupling device, the light propagating inside the light guide by means of reflection at boundary surfaces of the light guide, and the decoupling of the light out of the light guide being provided by means of the light decoupling device after a defined number of reflections of the light at the boundary surfaces of the light guide.

An optical structure of the display device according to the invention may furthermore, for example, comprise a light guiding device. In this case, at least one high-resolution holographic segment may be generated and displaced in the manner which is described in WO 2018/146326 A2. A low-resolution holographic segment may, for example, be generated by using the same light guiding device but optionally with a separate light coupling device into and a light decoupling device out of the light guide of the light guiding device, in a similar way as is described in WO 2018/146326 A2 for a stereoscopic segment.

Also during the generation of the at least one high-resolution holographic segment and of the at least one low-resolution holographic segment, the light then propagates inside a light guide of the light guiding device by means of reflection at boundary surfaces of the light guide. The decoupling of the light out of the light guide, or out of the light guiding device, is provided respectively for an individual segment by means of the light decoupling device after a defined number of reflections of the light at the boundary surfaces of the light guide. For different segments, the number of reflections may be the same. In other embodiments, the number of reflections may also be adjusted to be different. For a high-resolution holographic segment, for example, the decoupling out of the light guide of the light guiding device may take place after a different or other number of reflections than for a low-resolution holographic segment. For more than one high-resolution holographic segment or more than one low-resolution holographic segment, the decoupling of the individual high-resolution holographic segments or of the individual low-resolution holographic segments may also take place after a different number of reflections.

For example, the observer angular range of at least one high-resolution holographic segment may be adapted to the gaze direction of an observer, by adjusting the number of reflections in a modified way for this at least one segment.

The at least one optical system and the at least one light guide may therefore advantageously be provided for generating at least one high-resolution holographic segment and at least one low-resolution holographic segment and, when required, for generating at least one stereoscopic segment, the high-resolution holographic segment, the low-resolution holographic segment and, when required, the stereoscopic segment together form a field of view, inside which a three-dimensional scene or a three-dimensional object is representable.

Even if at least one light guiding device is provided in the display device according to the invention, imaging of the at least one spatial light modulator by means of the at least one light guiding device and the at least one optical system may be provided.

It may furthermore be advantageous for a light source image of at least one light source provided in the at least one illumination device to be provided by means of the optical system in the light path before coupling of the light into the light guiding device.

In this case, in particular for the at least one low-resolution holographic segment, the at least one light coupling device is preferably provided at or in a region of a position of a light source image.

According to the invention therefore, the coupling of the light into the light guide of the light guiding device takes place at or close to the position of a light source image.

Advantageously, the optical system may furthermore comprise two cylindrical optical elements, which are arranged crossed with respect to one another.

It may furthermore be advantageous for the optical system to be provided for generating a linear or one-dimensional light source image in the light path before coupling of the light into the light guiding device.

In this way, it is possible, in particular for the at least one low-resolution holographic segment, that with the two cylindrically configured optical elements, which may be configured as cylindrical lens elements and which have different focal lengths in the horizontal direction and in the vertical direction, a focus is generated at the position of the light coupling into the light guiding device, for example only in the horizontal direction. In the region of the coupling of the light into the light coupling device of the light guiding device, a linear or one-dimensional light source image is therefore generated. In the other direction, according to the example the vertical direction, a light source image is not generated until after the decoupling of the light out of the light guiding device.

When preferred single-parallax encoding of a hologram into the at least one spatial light modulation device is provided, a sweet spot may be generated in a non-encoding direction of the hologram in the beam path after the decoupling of the light out of the light guide of the light guiding device. In an encoding direction of the hologram and in the light direction after the at least one light guiding device, a virtual observer region is generated in a Fourier plane or in an image plane of the at least one spatial light modulation device. The virtual observer region is therefore provided in the encoding direction of the hologram in a Fourier plane of the spatial light modulation device. This plane, in which the Fourier transform of the hologram is formed also corresponds in this case to the plane of the light source image when no hologram is written, or encoded, into the spatial light modulation device. The image of the light source is in this case generated after the decoupling of the light out of the light guide at a defined distance from the light guide. In other words, a light source image of at least one light source of the at least one illumination device may be generated in the light path after the decoupling of the light out of the at least one light guiding device at the position of a virtual observer region in the encoding direction. This means that a virtual observer image, or a virtual viewing window, may be generated in a plane of the light source image or in a plane of an image of the spatial light modulation device.

In a non-encoding direction perpendicular thereto, when one preferred single-parallax encoding of a hologram into the at least spatial light modulation device is provided, a light source image of at least one light source of the at least one illumination device may be generated in the light path at or close to an coupling position of the light into the light guide.

In other words, there is a linear light source image, when no hologram is written or encoded into the spatial light modulation device, at or close to the coupling position of the light into the light guide.

The two cylindrical optical elements generate either a horizontal light source image, or a vertical light source image depending on the direction in which a hologram is encoded into the at least one spatial light modulation device, the light source images being formed at different positions in the beam path of the display device for the encoding direction and the non-encoding direction. For illustration, it may be mentioned here that the terms "horizontal (linear) light source image" and "vertical (linear) light source image" are to be understood as meaning that, for example, a horizontal image in the form of a vertical line or respectively a vertical image in the form of a horizontal line has been formed from a point light source. This applies when single-parallax encoding of a hologram into the spatial light modulation device of the display device according to the invention is carried out.

The object according to the invention is furthermore achieved by a method for generating a large field of view, inside which a scene or an object is represented with different resolutions, as claimed in the claims.

The method according to the invention for generating a large field of view, inside which a scene or an object is represented with different resolutions, is carried out by means of at least one illumination device, at least one spatial light modulation device and at least one optical system, wherein
  the at least one spatial light modulation device modulates incident light with required information of the scene or of the object,
  the at least one optical system multiply images the at least one spatial light modulation device and generates virtual viewing windows in accordance with the number of images of the at least one spatial light modulation device, the individual images of the at least one spatial light modulation device being combined with one another as segments and forming a field of view, at least one high-resolution holographic segment and at least one low-resolution holographic segment being generated in order to form the field of view.

Advantageously, the generation of the at least one high-resolution holographic segment and of the at least one low-resolution holographic segment may be carried out by means of a switchable or a controllable element of the optical system.

It may furthermore be preferred that two switchable or controllable optical elements are provided in the optical system, in order to generate the at least one high-resolution holographic segment a first switchable or controllable optical element being switched or controlled and a second switchable or controllable optical element not being switched or controlled, in order to generate the at least one low-resolution holographic segment the second switchable or controllable optical element being switched or controlled and the first switchable or controllable optical element not being switched or controlled.

There are now various possibilities for advantageously configuring the teaching of the present invention and/or combining the described exemplary embodiments or configurations with one another. In this regard, on the one hand, reference is to be made to the patent claims dependent on the independent patent claims, and on the other hand to the following explanation of the preferred exemplary embodiments of the invention with the aid of the drawings, in which generally preferred configurations of the teaching are also explained. The invention is in this case explained in principle with the exemplary embodiments described, but is not intended to be restricted to the latter.

It should briefly be mentioned that elements/parts/components which are the same also have the same references in the figures.

DETAILED DESCRIPTION OF THE INVENTION

Figure 1:
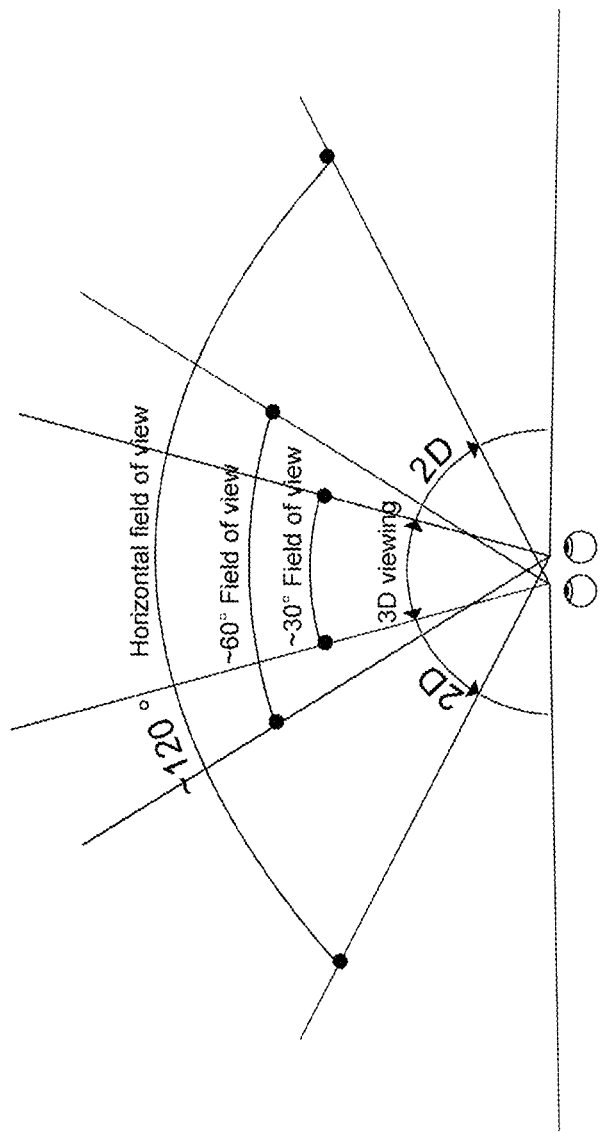
FIG. 1: shows a schematic illustration of a field of view of a human eye.

FIG. 1 shows a schematic illustration of a field of view of a human eye. This illustration is intended to serve for better understanding of the present invention.

The features represented in the field of view are imaged onto the retina of the human eye.

This means that the field of view represents the region in which visual perceptions are present. Only inside the fovea of the retina is the sharpest vision or clearest recognition of features in the field of view possible. The resolution or perception quality in respect of visual acuity, pattern recognition and color vision decreases significantly toward the peripheral region of the field of view. The horizontal extent of the field of view of an eye is about 120 degrees, as can be seen from FIG. 1, the representation of FIG. 1 being intended to relate only to one eye of a human. This is because the horizontal field of view of both eyes together is about 180 degrees to 214 degrees. The region of the field of view in which the eye can receive a three-dimensional impression is about 30 degrees. Outside this viewing angle of 30 degrees, the eye can no longer perform any depth perception. Inside a region of from about 30 degrees to about 60 degrees, stereoscopic vision is possible but without depth perception.

Figure 2:
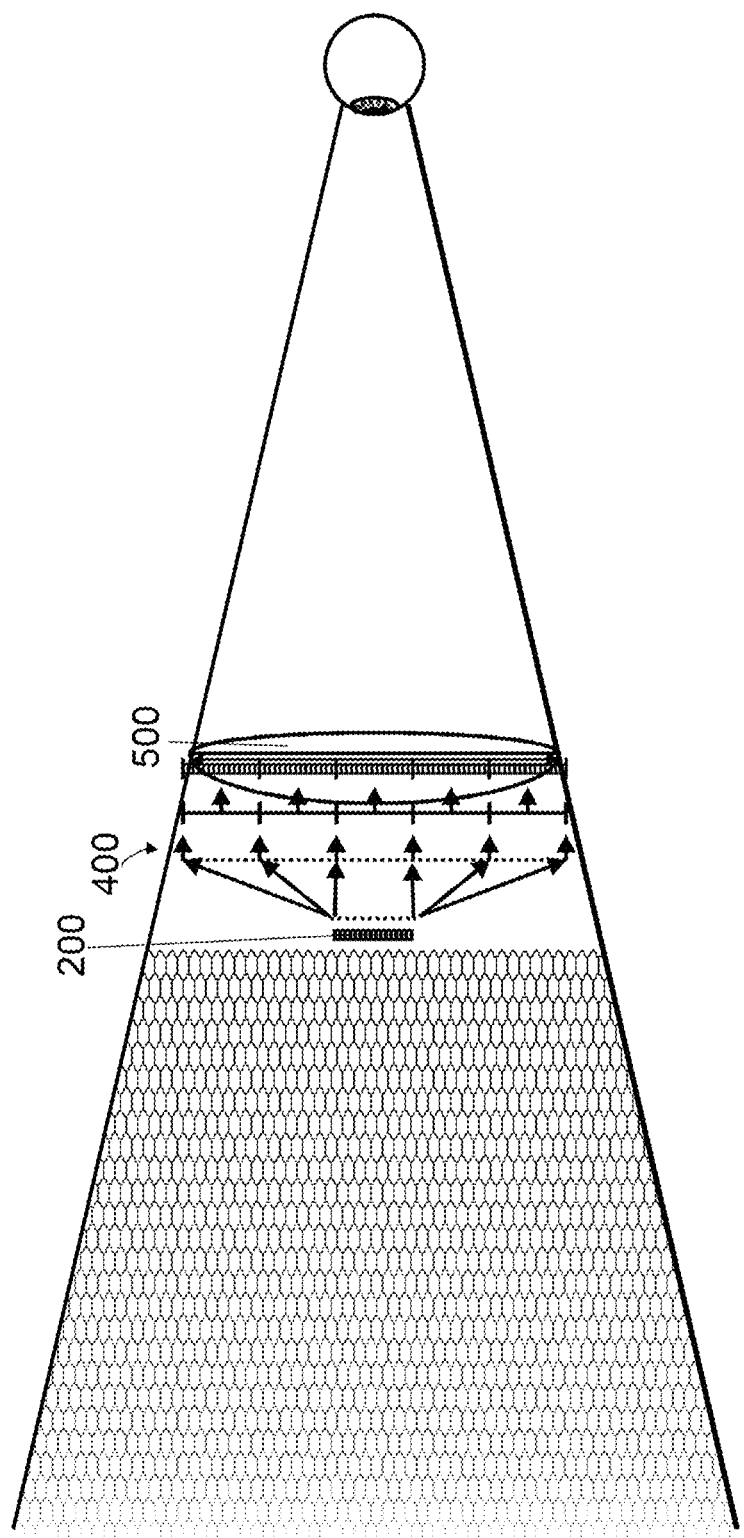
FIG. 2: shows a schematic illustration of a display device according to the prior art.

FIG. 2 illustrates a holographic display device in which a virtual viewing window is generated. In this case, a large field of view is achieved by segmentation of the field of view. With a spatial light modulator 200, a light deflecting device 400 and a lens 500, different parts of the field of view, which are visible from a virtual viewing window at the position of the eye of an observer, are in this case generated in chronological succession.

The spatial light modulator 200 is illustrated with chronologically successive coherent wavefronts, which carry different holographic information, with the light deflecting device 400 in a plurality of segments in a plane at least one-dimensionally. In this way, an image of the assembled light modulator is formed. The chronologically successively formed segmented wavefronts are directed in the direction of the eye pupil by imaging means. With the shown segments of the spatial light modulator, a spatial visibility region or a field of view is generated.

For understanding of the exemplary embodiments now described, the imaging beam path and the illumination beam path and the relationship of size of a virtual viewing window and field of view in a display device will initially be explained. The display device comprises an illumination device, a spatial light modulation device, which is referred to below as an SLM, and an optical system, which for explanation in this case comprises idealized lenses i.e. thin lenses without aberrations. Such a display device, however, would only have a limited field of view.

In particular, the field of view is in a fixed relationship with the size of the virtual viewing window, since both depend on the focal length of the optical system of the display device. If the virtual viewing window is enlarged, the field of view becomes smaller in size, and vice versa. In general, the optical system used influences both the illumination beam path and the imaging beam path inside the display device.

The optical system of the display device may in general comprise not just one imaging element but also a plurality of imaging elements. An overall focal length and a principal plane of the system may then be determined by the known methods of geometrical optics. The statements above then apply correspondingly for the overall system.

In the exemplary embodiments described below, a large field of view is generated by means of a display device. The field of view is in this case formed from at least one high-resolution holographic segment and at least one low-resolution holographic segment. These segments are respectively an image of the SLM or an image of a diffraction order in a Fourier plane of the SLM. It is, however, also possible to generate a plurality of high-resolution holographic segments and a plurality of low-resolution holographic segments, if the size of a field of view were to make this necessary. Since a person in their natural environment can only see and perceive a limited solid angle with a high resolution and a strong three-dimensional impression, this may be used when generating a large field of view. It is therefore possible that the objects of a three-dimensional scene, which an observer of the scene does not directly observe or focus on but which are only perceived in the background, may be represented with a lower resolution. The observer would therefore perceive the objects in the background with a lesser three-dimensional impression. The background of a three-dimensional scene to be represented, comprising a multiplicity of objects, which is visible in the entire field of view, may therefore be generated by at least one low-resolution holographic segment.

An object sighted or focused by the observer, or objects of the three-dimensional scene, should, however, have a strong three-dimensional impression. These objects, however, only need to be represented with a high resolution in a limited solid angular range of the field of view. To this end, at least one high-resolution holographic segment is generated by means of the display device. Depending on how large the solid angular range is, a plurality of high-resolution holographic segments may also be generated, which are arranged sequentially in order to generate this solid angular range. Inside this segment generated holographically with high resolution, the three-dimensional object focused on by the observer is reconstructed and represented. This means that the at least one high-resolution holographic segment is generated inside the at least one low-resolution holographic segment. The high-resolution holographic segment is superimposed or overlaps with the low-resolution holographic segment. Since the individual segment is an image of the SLM, and therefore also an image of the pixels of the SLM, the at least one high-resolution holographic segment represents an image with a high pixel density, while the at least one low-resolution holographic segment represents an image of the SLM with a lower pixel density.

The invention is not, however, intended to be restricted without exception to the combination of high-resolution holographic representation and low-resolution holographic representation.

As one exemplary embodiment will show, it is also possible to combine at least one high-resolution holographic segment and one low-resolution holographic segment additionally with at least one stereoscopic segment.

The relationship between the size of the virtual viewing window and the required number of pixels per degree of SLM will be explained below.

For an SLM having a pixel pitch p at a distance D from the virtual viewing window vw in the holographic display device and for light of the wavelength $\lambda$, a maximum size of the virtual viewing window is given as $vw=D*\lambda/p$. In the holographic display device which generates an image of the SLM, for example in a head-mounted display or a projection display, which is visible from the virtual viewing window, D and p are the distance and the pixel pitch of the image of the SLM to the virtual viewing window.

A virtual viewing window of the same size may, for example, also be generated with an SLM or an image of the SLM with a larger distance and a larger pixel pitch or pixel pitch of the image of the SLM, if the quotient D/p is kept constant.

A viewing angle of 1 degree on the SLM then corresponds there to an extent of $x=\tan 1°*D$. In order to determine the number of pixels N of the SLM inside the viewing angle of 1 degree, this extent on the SLM is divided by the pixel pitch, which gives $N=x/p=\tan 1° D/p$. The quotient D/p likewise occurs in this equation, so that it may be replaced with $N=\tan 1° vw/\lambda$. For a virtual viewing window with a size of about 7 mm and a wavelength of light of $\lambda=460$ nm, this would then give for example 266 pixels of the SLM. This value decreases linearly with the size of the virtual viewing window. For a virtual viewing window with a size of about 1 mm and the same wavelength of light of $\lambda=460$ nm, about 38 pixels/degree of viewing angle are then necessary. In this case, an SLM having 2000 complex-valued pixels (two pixels form a complex-valued pixel) with a suitably selected quotient D/p could generate a field of view, or viewing angle, of more than about 50 degrees.

The relationship between the size of the virtual viewing window and the visible resolution will now be explained.

For a holographic display device, or a holographic display, in which a virtual viewing window is generated, the size of the virtual viewing window is conventionally selected in such a way that this size is at least as great as the eye pupil of an observer. In this case, the eye pupil of an observer, when it is fully located in the virtual viewing window, acts as a diffraction-limited aperture for the light which enters the eye. In principle, the visible resolution of a holographic three-dimensional (3D) scene is then limited in the same way as the perception of the natural environment of an observer by the diffraction limitation of the pupil size of the eye and possibly by aberrations of the eye lens and by the distribution of photoreceptors on the retina of the eye.

A holographic reconstruction may, however, also be carried out with a virtual viewing window that is smaller than the eye pupil of an observer. In this case, the aperture of the virtual observer window, which is then located inside the eye pupil, acts as a diffraction-limited aperture that can limit the resolution with which a three-dimensional scene is perceived.

The present invention, however, is based on the insight that this limitation of the resolution is relevant only when the reconstructed scene is located directly at the center of the retina of the eye, i.e. it is imaged onto the fovea, which represents the region of sharpest vision on the retina, and is therefore present where this scene has a high resolution because of a high density of photoreceptors. A generated holographic segment with which a virtual viewing window that is smaller in its size than the eye pupil of an observer is generated is therefore generated, or used, according to the invention only for that part of a three-dimensional scene which does not strike the center of the retina of an observer eye and for which the visible resolution of the observer is reduced anyway. In this way, the number of pixels required in the spatial light modulation device can be reduced, without there being a loss of perceptible resolution.

Figure 3:
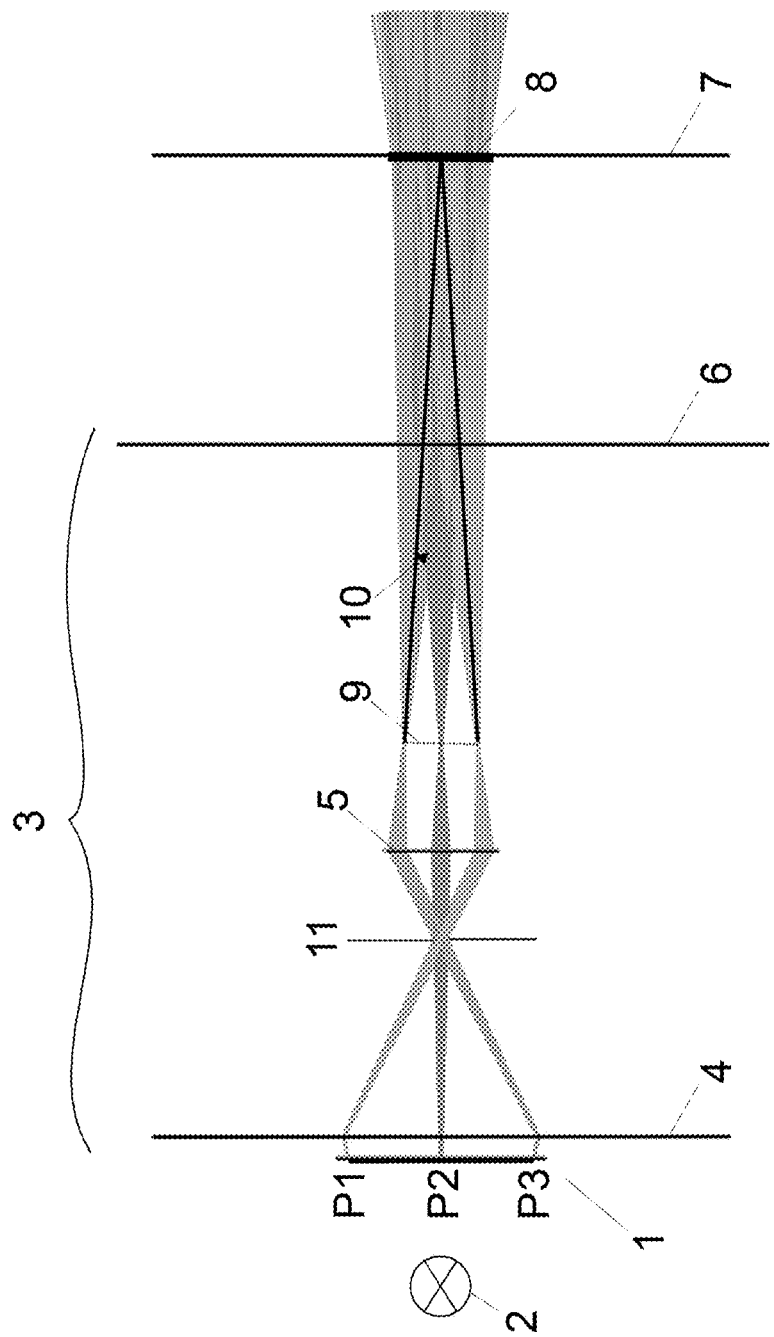
FIG. 3 shows a schematic illustration of a display device according to the invention during the generation of a high-resolution holographic segment.
Figure 4:
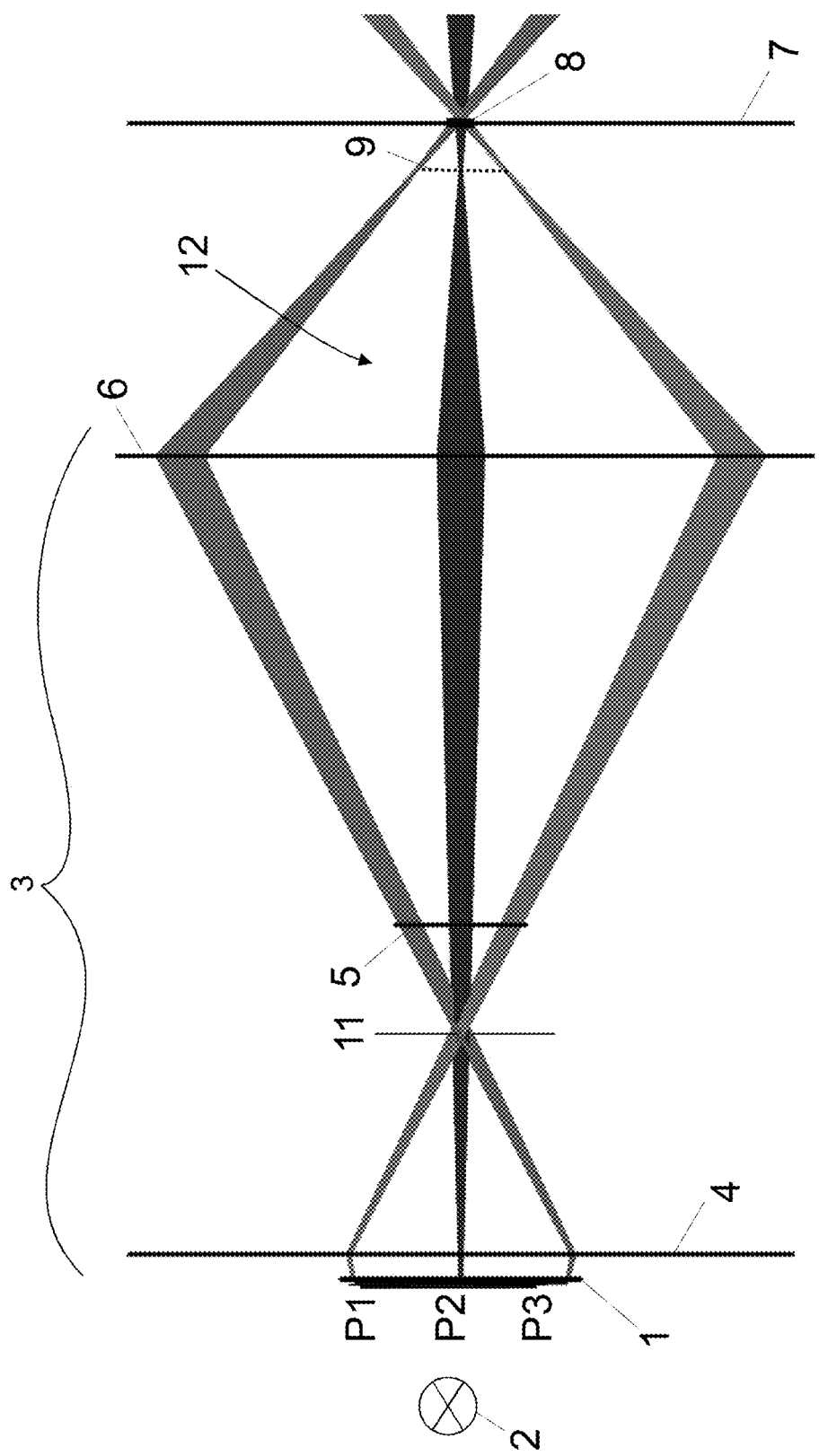
FIG. 4: shows a schematic illustration of the display device according to the invention according to FIG. 3 during the generation of a low-resolution holographic segment.

FIGS. 3 and 4 schematically show one exemplary embodiment of a holographic display device, with which at least one high-resolution holographic segment and at least one low-resolution holographic segment are generated. The display device to this end comprises at least one SLM 1, at least one illumination device, which comprises at least one light source 2, and at least one optical system 3. The optical system 3 is used for imaging SLM 1. To this end, the optical system 3 comprises at least one imaging element 4, which is configured to be passive. The imaging element 4 is arranged close to the SLM 1, and is used in this case primarily for imaging the SLM 1. In this case, in order to generate a large field of view, the SLM 1 is multiply imaged time-sequentially or alternatively simultaneously, and in this way a plurality of segments are generated which together and combined with one another lead to a large field of view. In other words, for a holographic segment, the optical system 3 respectively generates an intermediate image of the SLM 1. In this case, it is unimportant whether a high-resolution holographic segment or a low-resolution holographic segment is generated.

Furthermore, the optical system 3 comprises at least one switchable or controllable element. In this exemplary embodiment according to FIGS. 3 and 4, the optical system 3 comprises two switchable or controllable elements 5 and 6. The switchable or controllable elements 5 and 6 are in this case configured as lens elements, although it is also possible to use other switchable or controllable elements, for example switchable mirrors that deviate the light for different segments to different optical elements, for example different lenses. Instead of switchable lens elements that are switched on and off, it would for example also be possible to use optical systems similar to a zoom objective, in which the focal length is varied by mechanical modification of the distance between lens elements in order to adjust different focal lengths for various segments.

These switchable or controllable elements 5 and 6 are arranged in the beam path between the SLM 1 and an observer plane 7, although this arrangement is not compulsory. It is also possible that one switchable or controllable element of these two elements may be arranged before the SLM 1 in the light direction. These two switchable or controllable elements 5 and 6 adjust a differently large quotient D/p of the distance D of an image the SLM to the observer plane 7 and the pixel pitch p of the image of the pixels of the SLM 1, so as to vary the size of a virtual viewing window and of the field of view. By such an adjustment of the quotient D/p, the size of a virtual viewing window 8 to be generated in the observer plane 7 and of a viewing angle, or of a field of view, can be varied according to the switching state of the switchable or controllable elements 5 and 6.

FIG. 3 shows the display device, which is in a mode in which a high-resolution holographic segment is generated. In this case, in this figure especially the beam path between the SLM 1 and the observer plane 7 for a high-resolution holographic segment is illustrated. The illumination device comprises the light source 2, for illuminating the SLM 1 with sufficiently coherent light. In this exemplary embodiment according to FIGS. 3 and 4, the illumination of the SLM 1 is the same for a high-resolution holographic segment and a low-resolution holographic segment. This means that the same light source is used for the generation of these two segments. It is, of course, also possible to use two light sources for these two holographic segments to be generated. These two light sources may also be configured differently. It is, however, important that these two light sources emit sufficiently coherent light.

The two switchable or controllable elements 5 and 6 can respectively be brought into an ON state and into an OFF state. They are therefore configured so that they can be switched on and switched off, or can therefore be controlled in different states. In order to generate the high-resolution holographic segment according to FIG. 3, the first switchable or controllable element 5 is switched into an ON state and the second switchable or controllable element 6 is switched into an OFF state. This means that the first switchable or controllable element 5 therefore exhibits an effect on the light striking this element 5, the second switchable or controllable element 6 not exhibiting any effect, i.e. the incident light is not influenced in its propagation by the switchable or controllable element 6. In order to generate a high-resolution holographic segment, the light emitted by the light source 2 of the illumination device strikes the SLM 1 and is modulated by it according to the information of a three-dimensional scene. An image 9 of the SLM 1, by which a segment of a field of view is provided, is then generated by means of the optical system 3, i.e. by means of the imaging element 4 and the first switchable or controllable element 5. FIG. 3 shows the beam path from three pixels P1, P2, P3 of the SLM 1 through the image 9 of the SLM 1 generated by the optical system 3, which image is formed after the first switchable or controllable element 5, to the observer plane 7. One pixel P2 is in this case located in the middle of the SLM 1, and the other two pixels P1 and P3 are located at the lower and upper edge of the SLM 1. Shown for each pixel, there is a ray bundle whose aperture angle corresponds to the diffraction angle of a diffraction order of the pixels. In a filter plane 11 between the SLM 1 and the first switchable or controllable element 5, higher diffraction orders may for example be filtered out. In the beam path after the first switchable or controllable element 5, the image 9 of the SLM 1 is then generated. From the image 9 of the SLM 1, the light beams then continue in the direction of the observer plane 7. In this observer plane 7, the beam profiles of the individual pixels P1, P2 and P3 are then superimposed, a virtual viewing window 8 being formed during the generation of the high-resolution holographic segment in this observer plane 7. Through this virtual viewing window 8, an observer can observe a three-dimensionally generated scene or object in the field of view when their eye lies in the observer plane 7 in the region of the virtual viewing window 8.

The overall diameter of these beam profiles, coming from the pixels P1, P2 and P3, of the light at the position of their superposition in the observer plane 7 gives the extent of the virtual viewing window 8 generated. The extent of the virtual viewing window 8 may be seen in FIG. 3 by the thick gray line in the observer plane 7. As is apparent, the respective central light beams coming from the various pixels P1, P2 and P3 of the SLM 1 reach the center of the virtual viewing window 8 at different angles. The angle difference of the respective central beams from the edge pixels P1 and P3 of the SLM 1 gives the viewing angle, or the field of view, of the high-resolution holographic segment generated. The field of view generated in this case of the high-resolution holographic segment is provided in FIG. 3 with the reference sign 10 and delimited by black lines that come from the image 9 of the two outer pixels P1 and P3 of the SLM 1 and extend as far as the middle of the virtual viewing window 8.

An observer with their eye inside the virtual viewing window 8 in this case would see an image of the SLM 1 at the distance from the virtual viewing window 8 as is generated by the first switchable or controllable element 5. A holographic three-dimensional scene, which comprises individual object points in front of and behind the image 9 to be generated of the SLM 1, may be written or encoded into the SLM 1.

The resolution of the three-dimensional scene is an angular resolution which is given by the number of pixels per field of view/viewing angle of the SLM in one dimension, or direction. For example, a 5 degree field of view/viewing angle with 2000 pixels gives a resolution of 400 pixels/degree of viewing angle.

During the generation of a high-resolution holographic segment, a virtual viewing window that is large in its size is generated, which is larger than the eye pupil of an observer, i.e. more than about 6 mm in its extent. The field of view generated is, however, limited in its size to a few degrees, i.e. not more than about 10 degrees.

FIG. 4 illustrates the display device according to FIG. 3 during the generation of a low-resolution holographic segment. The low-resolution holographic segment is in this case generated according to the same principle as the high-resolution holographic segment according to FIG. 3. This means that, in this case as well, imaging or an image of the SLM 1 and thereby a segment and a virtual observer window are generated by means of the illumination device, the SLM 1 and the optical system 3. FIG. 4 in this case shows the beam path during the generation of a low-resolution holographic segment. To this end, the first switchable or controllable element 5 is switched into an OFF state, while the second switchable or controllable element 6 is switched into an ON state, so that only the second switchable or controllable element 6 influences the light. The light emitted by the light source 2 of the illumination device strikes the SLM 1 and is modulated by it according to the information of a three-dimensional scene. By means of the optical system 3, i.e. by means of the imaging element 4 and the second switchable or controllable element 5, an image 9 of the SLM 1, by which a segment of a field of view is provided, is then generated. The image 9 of the SLM 1 is now no longer formed in the light direction after the first switchable or controllable element 5, as shown in FIG. 3, but instead only after the second switchable or controllable element 6. As is apparent, this image 9 of the SLM 1 is formed in the vicinity of the observer plane 7 and, however, has a different magnification and a different distance to the observer plane 7 than the image 9 according to FIG. 3. A virtual viewing window 8 is likewise formed in the observer plane 7 during the generation of the low-resolution holographic segment. Through this virtual viewing window 8, the observer can observe a three-dimensionally generated scene or object in a field of view 12, when their eye lies in the observer plane 7 in the region of the virtual viewing window 8. This part of the scene or of the object is, however, represented with a lower resolution than the part of the scene which is generated and represented according to FIG. 3.

The aperture angle of the beams which come from the individual pixels P1, P2 and P3 again corresponds to the diffraction angle of the pixels as in FIG. 3. In this case, because of the other switching states of the switchable or controllable elements 5 and 6, a beam path is now in which the overall diameter of the light beams, which come from the pixels P1, P2 and P3 of the SLM 1, in the observer plane 7 in which the virtual viewing window 8 is formed, has only a small extent at the position of superposition. In this way, only a viewing window 8 that is small in its extent is therefore generated. The size of the virtual viewing window 8 when generating a low-resolution holographic segment is less than about 2 mm. As may be seen in FIG. 4, however, the light beams coming from the pixels P1, P2 and P3 of the SLM 1 arrive in the observer plane 7, and in the virtual viewing window 8 there, at much larger different angles than in FIG. 3. This is again made clear in FIG. 4 by the black lines from the edge pixels P1 and P3 of the image 11 of the SLM 1 in the middle of the virtual viewing window 8. A large angular range is generated in this way, so that a large field of view 12, or a large viewing angle, is provided.

By the second switchable or controllable element 6, an image of the SLM 1 is generated which in this case lies close to the observer plane 7. It is, however, again possible for a three-dimensional scene having object points that are located at arbitrary distances from the observer plane 7 to be written or encoded into the SLM 1.

The resolution of the three-dimensional scene in the at least one low-resolution holographic segment is again determined by the number of pixels of the SLM per field of view or viewing angle in one dimension, or direction. If, for example, a field of view of 66 degrees is generated with 2000 pixels, there would be a resolution of 30 pixels/degree of field of view. Here again, these are only intended to be exemplary values.

After its generation, the generated and represented at least one high-resolution holographic segment according to FIG. 3 is then located at least partially inside the generated and represented low-resolution holographic segment according to FIG. 4. In order to obtain a large field of view, with which the perturbing vergence-accommodation conflict can be fully avoided, it is possible to generate a plurality or a multiplicity of high-resolution holographic segments as well as a plurality or a multiplicity of low-resolution holographic segments. These holographic segments are then generated according to the same principle as in FIGS. 3 and 4. The generation may be carried out time-sequentially or alternatively at the same time (simultaneously).

The at least one high-resolution holographic segment, as well as the at least one low-resolution holographic segment, may be displaced by means of a tracking device to a different position in the field of view, when this is necessary, for example when the observer of the three-dimensional scene shifts their focus from one object to another object inside the three-dimensional scene, or also when the observer moves to a different position or only moves their head. To this end, that virtual viewing window which is generated in connection with the holographic segment to be displaced is followed to a correspondingly new position in the observer plane. A gaze-tracking device in this case detects and tracks the gaze of the observer observing the object or the scene. The tracking device also adapts the position of the image of the SLM or the position of the at least one high-resolution holographic segment and/or the position of the at least one low-resolution holographic segment to a focal position of the eye of the observer, determined by means of the gaze-tracking device.

With the exemplary embodiment according to FIGS. 3 and 4, it is shown that with a simple structure of the display device, in which the optical system comprises switchable or controllable elements, generation of at least one high-resolution holographic segment and of at least one low-resolution holographic segment is possible and achievable.

Figure 5:
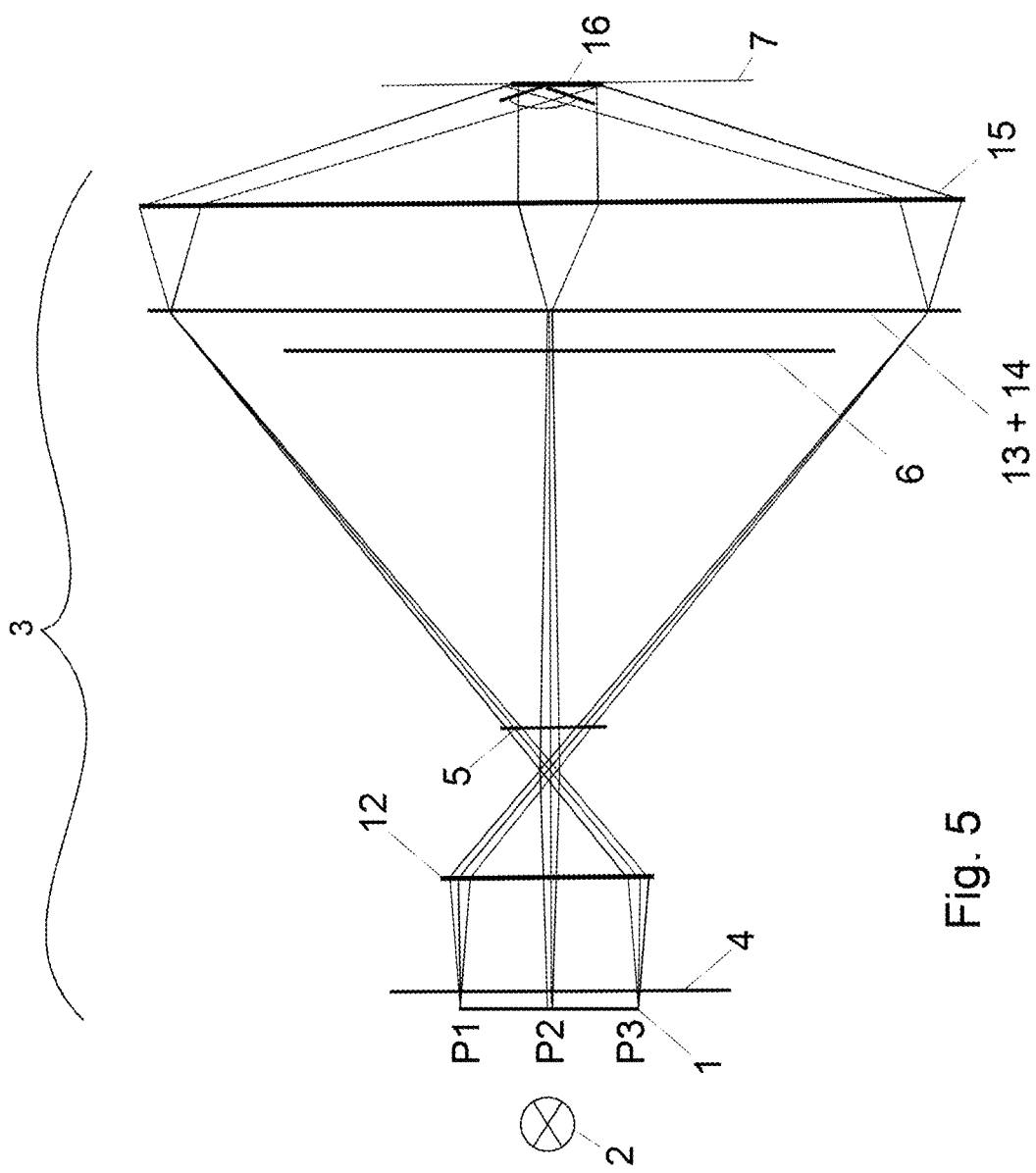
FIG. 5: shows a schematic illustration of the display device according to the invention with a representation of the high-resolution holographic segment and the low-resolution holographic segment in connection with the generation of an additional stereoscopic segment.

FIG. 5 illustrates another display device, with which, in addition to the at least one high-resolution holographic segment and the at least one low-resolution holographic segment, at least one stereoscopic segment is also generated. In this way, the field of view may be increased further. The individual segments may at least partially be superimposed or overlap. In this case, the at least one high-resolution holographic segment is at least partially superimposed on the at least one low-resolution holographic segment, these two holographic segments being superimposed with the stereoscopic segment and being located entirely inside the stereoscopic segment. The lateral regions of the field of view are therefore formed by the at least one stereoscopic segment. In this stereoscopic segment, regions of the three-dimensional scene are then represented which the observer neither focuses on nor perceives three-dimensionally, but would in any event see only with a low resolution and without depth perception.

In other words, the at least one high-resolution holographic segment is then located inside the generated and represented low-resolution holographic segment. This relates to the general representation of these two segments in generating a large field of view according to the display device according to FIGS. 3 and 4. However, if at least one stereoscopic segment is also generated in addition and the field of view is thereby increased further, the at least one high-resolution holographic segment and the at least one low-resolution holographic segment are located inside the additionally generated and represented stereoscopic segment.

FIG. 5 shows a display device for generating an additional stereoscopic segment, the display device according to FIGS. 3 and 4 then being configured according to FIG. 5. FIG. 5 thus shows a refinement of the described display device according to FIGS. 3 and 4.

The display device comprises the same illumination device 2, the same SLM 1 and the same optical system 3 as can be seen in FIGS. 3 and 4. The imaging element 4, which is located close to the SLM 1, is now configured to be switchable or controllable. A filter plane 11 is also provided, as in FIGS. 3 and 4. The filter plane 11 may, for example, be configured as a switchable aperture or stop, although it would in this case be switched off so that no filtering takes place in this plane 11. Furthermore, the optical system 3 comprises further switchable imaging elements 12 and 13 and a switchable diffuser 14. Light beams coming from three pixels P1, P2 and P3 are again shown.

With such a display device, the high-resolution holographic segment and the low-resolution holographic segment may also be generated in the same way as described according to FIGS. 3 and 4. For the generation of these holographic segments, the additional switchable imaging elements 12, 13 and the diffuser 14 are switched off, the imaging element 4 close to the SLM 1, which is in this case configured to be switchable, being in a switched-on state.

To generate at least one stereoscopic segment, the imaging element 4 and the two switchable or controllable elements 5 and 6 are switched off, i.e. they are in an OFF state. Instead, the two additional switchable imaging elements 12 and 13 and the diffuser 14 are switched on, i.e. they are in an ON state. With the aid of the imaging element 12, a magnified intermediate image of the SLM 1 is generated at the position of the imaging element 13 and of the switchable diffuser 14. The diffuser 14 is in this case switched on, and therefore increases the angular range of the light from each pixel of the SLM 1.

With a further additional imaging element 15, which is however not configured to be switchable or controllable, both imaging of the SLM 1 at a large distance and the generation of a sweet spot 16 in the observer plane 7 are then carried out. The generated image of the SLM 1 at a large distance cannot, however, be shown in FIG. 5 for reasons of clarity. There are, however, approximately parallel ray bundles starting from the individual pixels P1, P2 and P3 of the SLM 1 in the observer plane 7, where they are superimposed with one another to form a sweet spot 16. The stereoscopic segment generated in this way, and therefore the generated field of view 17, are larger in this exemplary embodiment than the field of view which is generated in FIG. 4 by means of the low-resolution holographic segment.

In one numerical example, for example, the stereoscopic segment would generate a field of view of about 133 degrees. For an SLM having 2000 pixels, this corresponds for example to a resolution of approximately 15 pixels/degree.

This at least one stereoscopic segment is in this case configured as a segment which is fixed in the field of view. This means that this stereoscopic segment is not displaced to a different position in the field of view by the tracking device.

The high-resolution holographic segment could, for example, have a size of 8×8 degrees, and the low-resolution holographic segment could, for example, have a size of 50×50 degrees. Furthermore, the stereoscopic segment could, for example, have a size of 120×50 degrees. In this way, a large field of view, or a large viewing angle, of 120 degrees horizontally by 50 degrees vertically could be generated and achieved. The high-resolution holographic segment may in this case be displaced by means of the tracking device inside the field of view in a range of ±25 degrees in the horizontal direction and/or in the vertical direction. The low-resolution holographic segment may likewise be displaced in the horizontal direction inside the field of view in a range of approximately ±25 but is provided to be fixed, i.e. is not intended to be displaceable, in the vertical direction.

The invention is not, however, intended to be restricted to a fixed position of the stereoscopic segment. In other embodiments, this stereoscopic segment could additionally be displaced in the field of view.

If, in addition, a stereoscopic representation is generated besides the holographic representation, it is however sufficient for only a single stereoscopic segment to be generated with the display device. This single stereoscopic segment may already generate a large field of view. If at least one stereoscopic segment is respectively generated in a display device for the left eye of an observer and in a separate display device for the right eye of the same observer, a stereoscopic scene may be represented three-dimensionally in the conventional way for stereoscopy by displaying parallax information between the left and right views. Because of the parallax information, the observer can perceive a depth impression, even in angular ranges in which no focal information of the eye lens is available. The peripheral human field of view also comprises regions in which information is respectively visible only for one eye, see FIG. 1. The term stereoscopic segment is in this case generally also used for a segment that generates such a large field of view that parts thereof are visible only for one eye. The stereoscopic segments of the left eye and the right eye would then partially but not fully overlap.

The generation of a stereoscopic segment is not intended to be restricted to the configuration of the display device as shown here in FIG. 5. Since the generation of a stereoscopic segment does not require coherent light and can be generated with an amplitude SLM, in the general case it would, for example, also be possible to use different SLMs and different light sources for the generation of the holographic segments and of the stereoscopic segment. These beam paths of holographic segments and of the stereoscopic segment could, for example, be superimposed by means of a beam splitter element or mirror.

Figure 6:
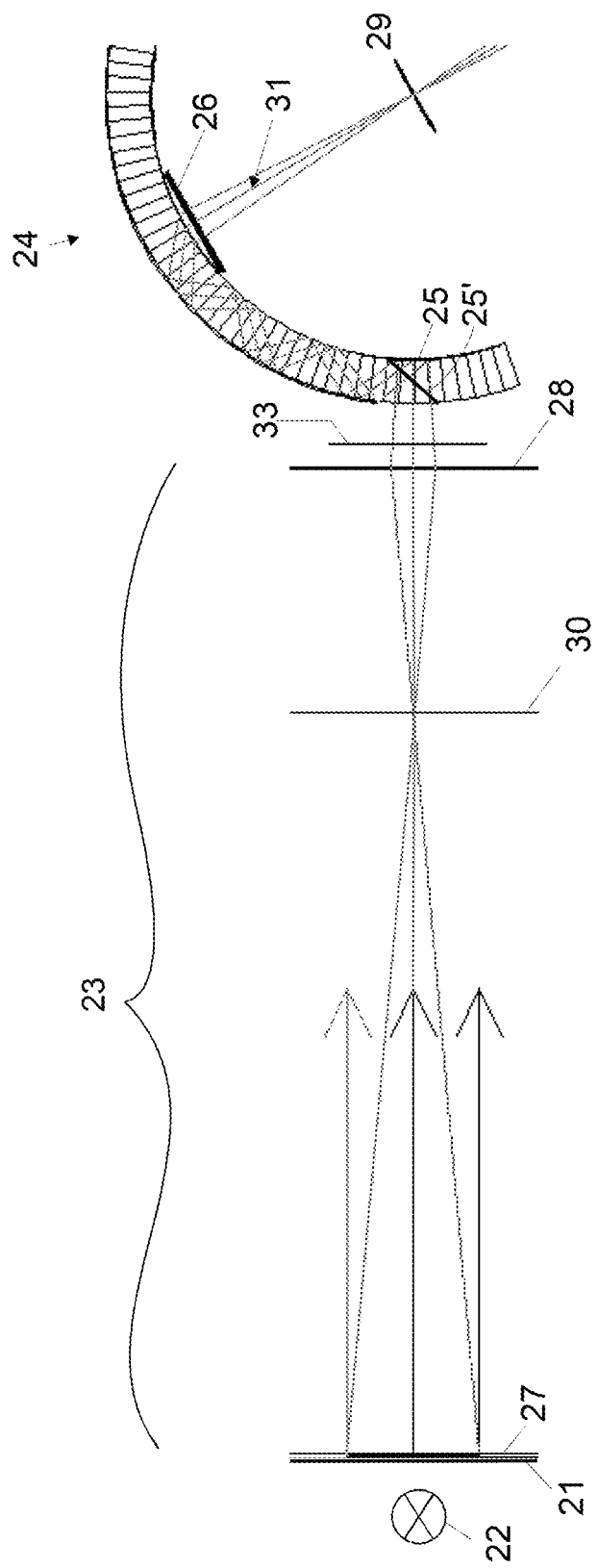
FIG. 6: shows a schematic illustration of an alternative display device according to the invention for the generation of a high-resolution holographic segment.

FIG. 6 shows an alternative display device to FIGS. 3, 4 and 5, with which at least one high-resolution holographic segment and at least one low-resolution holographic segment can be generated.

In a holographic display device, for example an HMD, an SLM is generally imaged. In the case of segmented multiple imaging of the SLM, an image of the SLM is respectively formed in each segment. Imaging of the SLM at a predetermined distance, however, presupposes particular focal lengths of the used imaging elements of the optical system and a particular distance of the SLM from these imaging elements. In particular, in general the imaging beam path and the illumination beam path in the display device are not independent of one another. Possibly required adjustments of the illumination beam path may sometimes also entail changes of the imaging beam path.

In one configuration of the display device with a flat or planar light guiding device and at least one imaging element, for example a lens element, in the light direction before coupling of the light into the light guiding device, for example the need arises to vary the focal length of this at least one imaging element in order adjust the same position of a virtual viewing window for different segments of multiple imaging of the SLM. If the distance of the SLM from the imaging element is fixed, the position of the imaging of the SLM changes when the focal length of the imaging element is varied. In the case of segmented multiple imaging of the SLM, a different image plane of the SLM would therefore be formed for each segment.

In a holographic display device, it is not absolutely necessary to have a common image plane for all segments of the multiple imaging. A 3D scene may also be represented continuously over segment boundaries with different image planes of the SLM, for example by the focal lengths of subholograms of a hologram being adapted to the SLM in the individual segments. On the other hand, however, a hologram calculation is simplified when the image plane of the SLM is at least similar for all segments to be generated, i.e. for example it differs only by a few centimeters but not by several meters.

In order to generate a high-resolution holographic segment, the display device according to FIG. 6 also comprises a light guiding device 24 besides at least one SLM 21, an illumination device having at least one light source 22, which illuminates the SLM 21, and an optical system 23. The light guiding device 24 comprises a light guide, which is configured here to be curved, two light coupling devices 25 and 25' and a light decoupling device 26. The one light coupling device 25 may, for example, comprise at least one grating element. The other light coupling device 25' may, for example, comprise a mirror element for light coupling into the light guide, in which case the mirror element may be configured as a sloped surface which has been rendered reflective, and which is arranged in the light guide. The mirror element may, for example, also be configured as a reflective wire grid polarizer, so that only light of a particular polarization direction is coupled into the light guide by this light coupling device 25'. The light decoupling device 26 may in this case comprise a grating element. The grating element may have a grating period varying with the light incidence position, in order to allow decoupling of the light from the light guiding device 24 perpendicularly to the surface of the light guide at each light incidence position. Besides an imaging element 27, in the light direction after the SLM 21 the optical system 23 also comprises at least one switchable or controllable element. In this exemplary embodiment, the optical system comprises at least one switchable or controllable element, which is denoted here by the reference sign 28. The at least one switchable or controllable element may, for example, be a lens element, the focal length of which can be varied by driving. As an alternative, the switchable or controllable element may also, for example, be configured as a lens system, the overall focal length of which can be varied, for instance in the manner of a zoom objective, by the distance of the individual lens elements being varied. The switchable or controllable element may, for example, also be configured as two diffraction gratings arranged perpendicularly to one another with a controllable and adjustable grating period, into which different lens functions can be written. Furthermore, the switchable or controllable element could also, for example, be configured as two lens elements that can be switched on or off. In addition, a polarization switch 33 may be provided. The optical system 23 generates an intermediate image 30 of the light source 22, and therefore also an intermediate image of a virtual viewing window 29 to be generated. Furthermore, the intermediate image of the virtual viewing window, and also the intermediate image 30 of the light source 22, are imaged by the at least one switchable or controllable element 28 into the actual virtual viewing window 29, or into an observer plane. The light guiding device 24 located in the display device is arranged in the beam path after the intermediate image 30 of the virtual viewing window 29 and of the at least one switchable or controllable element 28. The arrangement comprising the imaging element 27 and the at least one switchable or controllable element 28 furthermore also generates an image of the SLM 21. The at least one switchable or controllable element 28, which images the intermediate image of the virtual observer window, or the intermediate image 30 of the light source 22, also contributes to the imaging of the SLM 21. With a suitable selection of the focal lengths of the imaging element 27 and of the at least one switchable or controllable element 28, an image of the SLM 21 is formed inside the light guide of the light guiding device 24.

As may furthermore be seen, after passing through the optical system 23 the light enters the light guiding device 24 through the light coupling device 25, propagates by means of total internal reflection in the light guide and is then coupled out by means of the light decoupling device 26. In this regard, a plurality of light beams that come from a plurality of pixels of the SLM 21 are shown. For each individual pixel of the SLM 21, a focus is in this case respectively formed inside the light guide of the light guiding device 24 by means of the optical system 23. This means that an image of the SLM 21 is formed inside the light guide of the light guiding device 24.

The focal length of the at least one switchable or controllable element 28 is selected in such a way that a virtual viewing window 29 is formed after coupling the light out of the light guiding device 24.

In order to generate a high-resolution holographic segment with the display device according to FIG. 6, the at least one switchable or controllable element 28 is switched or driven correspondingly into a defined driving state. If the at least one switchable or controllable element is, for example, a lens element having a variable focal length, the defined driving state corresponds to a defined focal length, which is adjusted. If the at least one switchable or controllable element is configured as a diffraction grating, a particular lens function may likewise be written into this diffraction grating. If the at least one switchable or controllable element is configured as two lens elements that can be switched on/off, in a similar way as in FIG. 3 one of the two switchable lens element would be switched into an ON state and the further switchable lens elements would be switched into an OFF state. Furthermore, the light coupling device 25' must be configured to be switchable. So that the incident light can be coupled into the light guide of the light guiding device 24 by the one light coupling device 25, the light must pass through the other light coupling device 25' before being coupled into thereby. The light coupling device 25' must therefore be switched off in the present case.

Either the light coupling device 25' itself should be configured to be switchable, or separate switching should be carried out with another element which either couples the light into the light coupling device 25' or does not couple it. If the light coupling device 25' is configured for example as a reflective wire grid polarizer, which reflects and then couples in light of one polarization direction and transmits, and therefore does not couple in, light of another polarization direction perpendicular thereto, the separate switching element may for example be the polarization switch 33.

If the light coupling device 25' transmits the light, this light strikes the further light coupling device 25 lying behind it and is coupled in by it.

As an alternative, for example, the light coupling device 25' may also be configured as a conventional mirror element and at least one switchable or tiltable mirror element may be arranged in the light path between the SLM and the light coupling device, which element directs the light either to the light coupling device 25' in order to couple it in, or directs it past the light coupling device 25 in order not to couple it in. For example, the two light coupling devices 25 and 25' may also be arranged next to one another and not successively in the light guide, in which case at least one switchable or tiltable mirror element may direct the light either to the light coupling device 25 or to the light coupling device 25'.

In order to generate a high-resolution holographic segment as already mentioned the light coupling device 25' is switched off, so that the light passes through this light coupling device 25' and is coupled into the light guide by the light coupling device 25 lying behind.

In order to generate a high-resolution holographic segment, the light emitted by the light source 22 of the illumination device strikes the SLM 21 and is modulated by it according to the information of a three-dimensional scene. By means of the optical system 23, i.e. by means of the imaging element 27 and the first switchable or controllable element, an image of the SLM 21 is then generated, by which image a high-resolution holographic segment of a field of view 31 is provided. The image of the SLM 21 which is formed after the first switchable or controllable element, is formed inside the light guiding device 24. In the observer plane, a virtual viewing window 29 is formed during the generation of the high-resolution holographic segment. Through this virtual viewing window 29, an observer can observe a three-dimensionally generated scene or object in the field of view 31 when their eye lies in the observer plane in the region of the virtual viewing window 29.

In this way, a plurality of high-resolution holographic segments may also be generated, which combined together increase the high-resolution viewing angle in the overall field of view. For example, in order to generate a plurality of high-resolution holographic segments, the number of reflections in the light guide may be adjusted differently for each segment.

With such a display device according to FIG. 6, at least one low-resolution holographic segment may also be generated in order to further increase the field of view. This procedure will be explained in connection with FIG. 7.

Figure 7:
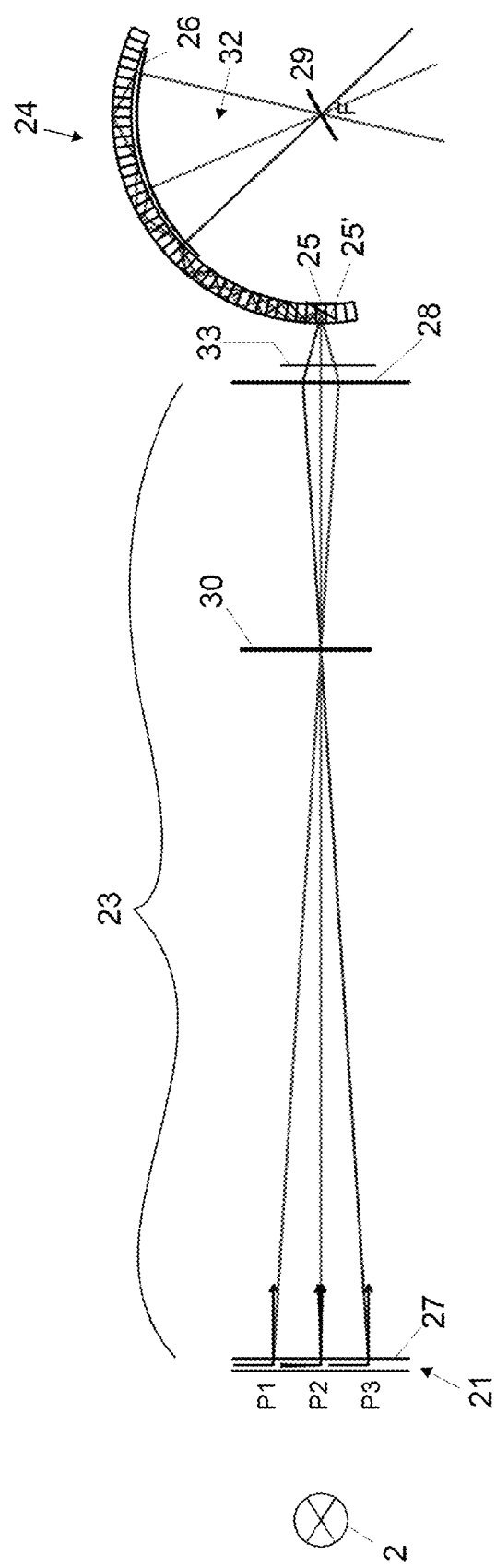
FIG. 7: shows a schematic illustration of the alternative display device according to the invention according to FIG. 6 during the generation of a low-resolution holographic segment.

The display device shown in FIG. 7 corresponds in terms of structure to the structure of the display device according to FIG. 6, since the same display device as for the generation of a high-resolution holographic segment is used for the generation of a low-resolution holographic segment. The display device represented in FIG. 7 therefore again comprises the illumination device with the at least one light source 22, the SLM 21, the optical system 23 and the light guiding device 24. The light guiding device 24 again comprises the same light guide, the two light coupling devices 25 and 25' and the light decoupling device 26. The light guide is configured to be curved. In this case as well, the light coupling device 25' may comprise a mirror element for light coupling into the light guide, in which case the mirror element may be configured as a sloped surface which has been rendered reflective, and which is arranged in the light guide. In contrast to FIG. 6, however, the light coupling device 25' is now switched on, so that the light is coupled in at it into the light guide. No light therefore strikes the subsequent light coupling device 25.

The light decoupling device 26 may comprise a grating element. The grating element may have a grating period varying with the light incidence position, in order to allow couple of the light out of the light guiding device 24 perpendicularly to the surface of the light guide at each light incidence position. Only one light decoupling device 26 is shown in FIG. 7. In general, however, the light guide may also comprise separate light decoupling devices for the at least one high-resolution holographic segment and the at least one low-resolution holographic segment. These separate light decoupling devices may, for example, respectively comprise at least one switchable grating element, which is switched on for the at least one high-resolution holographic segment and is switched off for the at least one low-resolution holographic segment, or vice versa. The light decoupling devices may be configured according to the embodiments in WO 2019/012028, the disclosures of WO 2019/012028 also being intended to be fully incorporated here.

In order to increase the field of view, the light emitted by the illumination device is directed onto the SLM 21 and is correspondingly modulated by it with the information of an object to be represented or of a scene to be represented. This modulated light, which for the sake of clarity in this case comes from only three pixels P1, P2 and P3 of the SLM 21 and is represented by three light beams in different gray scales, is focused onto the light coupling device 25' by means of the optical system 23, i.e. in this case by means of the imaging element 27 and the at least one switchable or controllable element 28. If, for example, the at least one switchable or controllable element 28 is a lens element with a variable focal length, this focal length is adjusted (to a different value than in FIG. 6) in such a way that a focus is formed at the position of the light coupling device 25'. In this case, an image 30 of the light source 22 is formed in the light direction before the at least one switchable or controllable element 28 of the optical system, so that an image of the light source of the illumination device is formed or generated there. By switching or controlling the at least one switchable or controllable element 28, in particular by generating a focus at the position of the light coupling device 25', the light coming from the individual pixels P1, P2, P3, . . . PN of the SLM 21 strikes the light guiding device 24, in particular the light coupling device 25', at different angles on average, and is coupled by this light coupling device 25' into the light guide. This is a substantial difference from FIG. 6, where because of the corresponding different switching state or control state of the at least one switchable or controllable element 28 there is no focus at the position of the light coupling device, but instead light from all pixels P1, P2, P3, . . . PN of the SLM 21 strike the light coupling device 25 at the same perpendicular angle. By way of the switching state or control state of the at least one switchable or controllable element 28, the angle of incidence of the light of the different pixels onto the light guiding device 24 is therefore adjusted, in such a way that it is the same for all pixels for the at least one high-resolution holographic segment but different for all pixels for the at least one low-resolution holographic segment. This, in combination with different light coupling devices 25 and 25', leads to different propagation of the light in the light guide for the at least one high-resolution holographic segment and the at least one low-resolution holographic segment. Furthermore, in connection with the light decoupling device 26, this different propagation in the light guide may be used in order to obtain a field of view of different size for the at least one high-resolution holographic segment and the at least one low-resolution holographic segment. In both cases, however, light is coupled out of the light guide of the light guiding device 24 after the same number of reflections respectively for all pixels.

For the low-resolution holographic segment, which is shown in FIG. 7, the light coming from the individual pixels P1, P2, P3, . . . PN of the SLM 21 strikes the light guiding device 24, in particular the light coupling device 25', at different angles on average. A coupling angular spectrum of the light is thereby defined. The three light beams coming from the pixels P1, P2 and P3 therefore strike the light coupling device 25' at different coupling angles. These three light beams are coupled into the light guide by means of the mirror element of the light coupling device 25', and then propagate with different propagation angles in the light guide by total internal reflection at the boundary surfaces of the light guide. The angular spectrum which is coupled in, or the coupling angular spectrum, is in this case approximately 30 degrees in air and 20 degrees inside the light guide. After a previously determined or defined number of reflections of the light in the light guide, this light is then coupled out of the light guide. In this exemplary embodiment, the light beams which are coupled in are coupled out of the light guide after respectively four reflections at the inner and outer surfaces, or boundary surfaces, of the light guide by means of the light decoupling device 26. The light propagating in the light guiding device 24 or in the light guide is coupled out of the light guiding device 24 or the light guide perpendicularly relative to the local surface of the light guide, but because of the curvature of the light guide at different angles on average relative to a virtual viewing window 29. In this way, a decoupling angular spectrum of the light is defined. As may be seen from FIG. 7, after the decoupling of the light out of the light guiding device 24, as seen from a focal point F of the light beams in the virtual viewing window 29, there is a field of view 32 which is laterally bounded by the outer two light beams represented. The field of view 32 generated in this case has an angular range of up to 60 degrees. As may therefore be seen, the decoupling angular spectrum of the light is approximately two times as great as the angular spectrum, coupled into the light guide, of the light. In this way, a low-resolution holographic segment is therefore generated, with which it is possible to generate a large field of view, inside which a low-resolution holographic representation can be generated.

In this case as well, a plurality of low-resolution holographic segments may be generated, which combined together increase the low-resolution viewing angle in the overall field of view.

The generation of a large field of view is therefore carried out by generating at least one high-resolution holographic segment and at least one low-resolution holographic segment, these segments together forming the field of view, or the overall field of view. The increase in the field of view for the low-resolution holographic segment by propagation of an angular spectrum of the light and decoupling of the light after a previously determined number of reflections and likewise the generation of a high-resolution holographic segment, is not however intended to be restricted to a curved light guide as represented here, but would also be usable in the same way in the case of a plane-configured light guide in a light guiding device.

Furthermore, in such a display device according to FIGS. 6 and 7, at least one stereoscopic segment may also be generated in addition to the at least one high-resolution holographic segment and the at least one low-resolution holographic segment, in order to increase the field of view even further, or to adapt the field of view generated with the display device to a field of view that would be perceived by an observer in their natural environment.

If a combination of a stereoscopic segment with at least one holographic segment is provided, a gaze-tracking device may likewise be provided. With such a gaze-tracking and tracking device, both the position of the holographic segment in the field of view may be displaced according to the gaze direction of the respective eye of the observer, and the depth of the image of the SLM may be adapted for the stereoscopic segment and optionally also for the at least one holographic segment. In the central region of the retina, the greatest lateral resolution and a full three-dimensional depth of the represented scene or object are thus obtained. Outside the central region of the retina, there is then only a two-dimensional scene or object in the stereoscopic segment. Even outside the central region of the retina, however, a possible accommodation-vergence conflict is avoided by the at least one low-resolution holographic segment. A substantial improvement in the image quality is in this case achieved when the image contents, or the objects to be represented of a scene, are generated with at least one low-resolution holographic segment over an angular range of the field of view larger than the portion which is covered by the high-resolution holographic segment.

Figure 8:
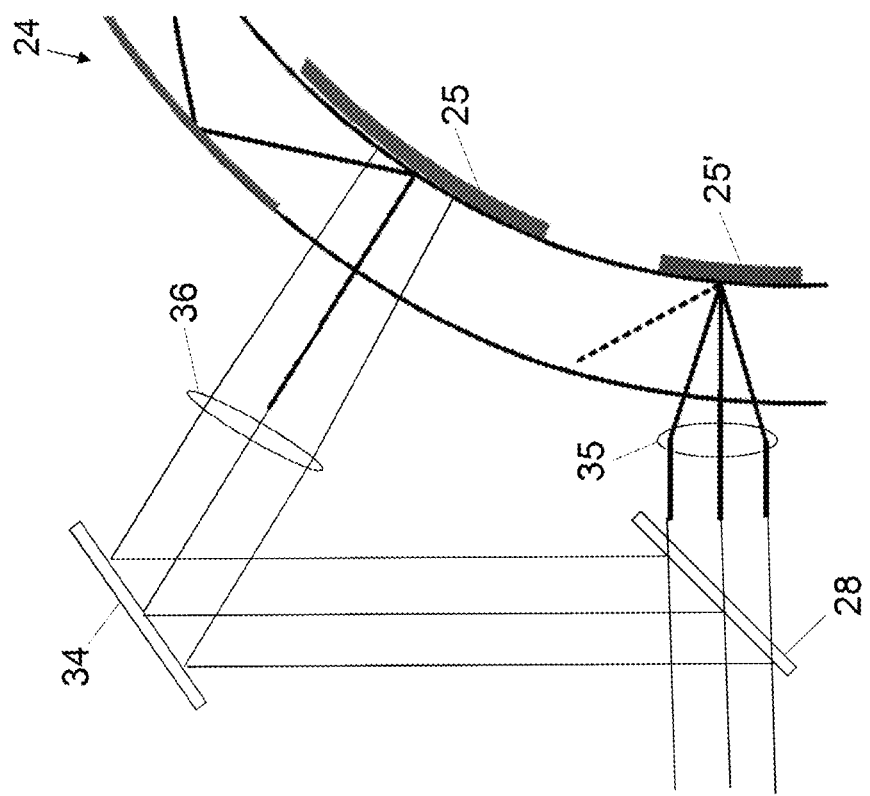
FIG. 8: shows a schematic illustration of the alternative display device according to the invention according to FIGS. 6 and 7 in an alternative arrangement of the light coupling devices for the generation of a low-resolution holographic segment and for the generation of a high-resolution holographic segment.

FIG. 8 shows a portion of a display device according to FIG. 6 or 7, although in this case the light coupling device 25' for at least one low-resolution holographic segment and the light coupling device 25 for at least one high-resolution holographic segment in the light guiding device 24 are arranged not successively as in FIGS. 6 and 7, but next to one another. In this exemplary embodiment both light coupling devices 25 and 25' comprise at least one grating element. The at least one switchable or controllable element 28 is in this case configured as a switchable mirror element. If the at least one switchable or controllable element 28 is switched off, or in an OFF state, the light continues to propagate to the light coupling device 25'. If the at least one switchable or controllable element 28 is switched on, or in an ON state, the light is instead deflected by means of a further mirror element 34 to the light coupling device 25. In this case, for example, static lens elements 35 and 36 may also be used between the at least one switchable or controllable element 28 and the respective light coupling device 25 or 25', in order to focus the light differently for the at least one low-resolution holographic segment and the at least one high-resolution holographic segment.

The invention is of course not intended to be restricted to particular arrangements of the light coupling device(s). In other embodiments, for example, the same light coupling device may also be used for both holographic segments, i.e. for the at least one high-resolution holographic segment and the at least one low-resolution holographic segment.

Figure 10:
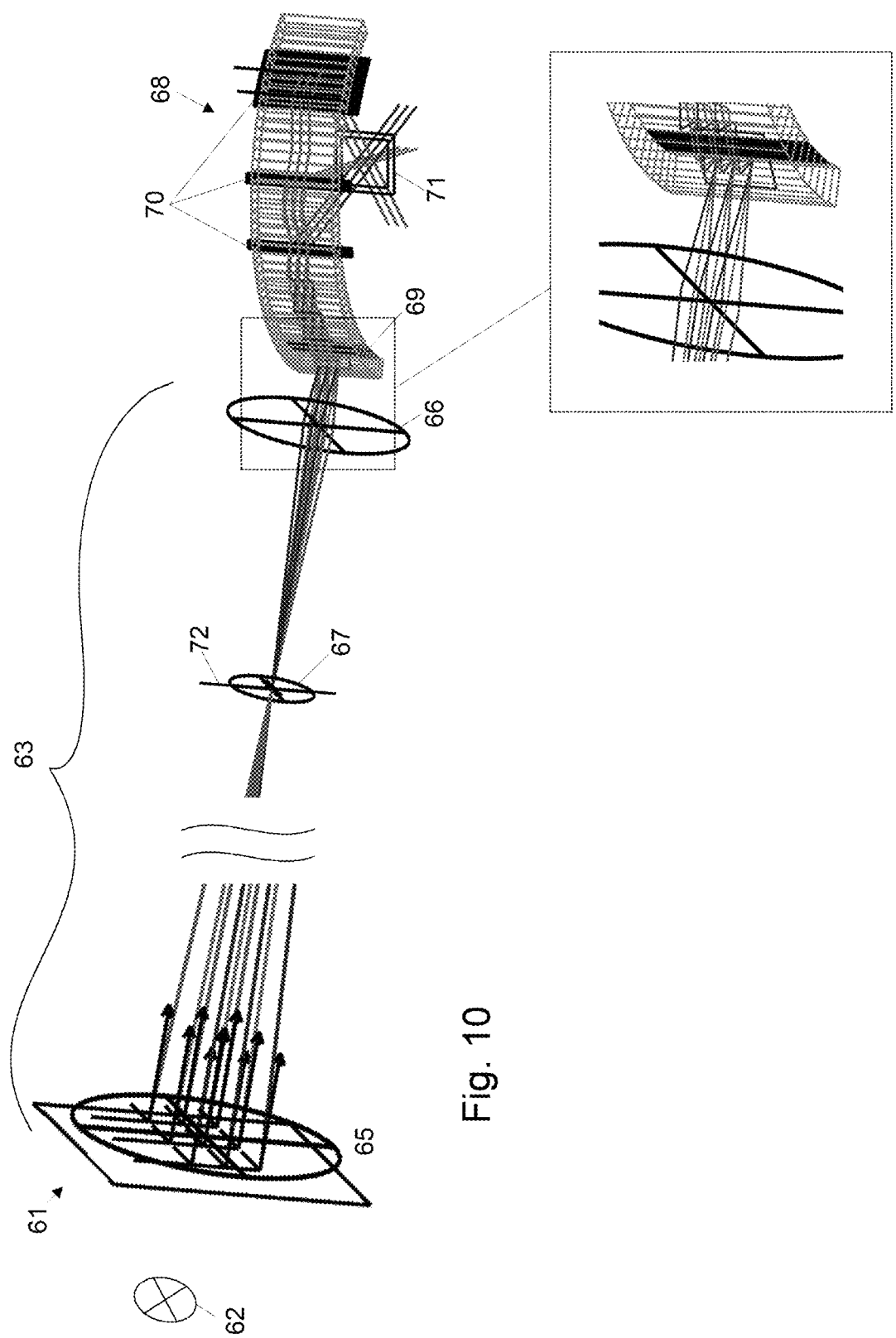
FIG. 10: shows a schematic illustration of an alternative configuration of the display device according to FIG. 9.

It is also possible to use a display device for the generation of a high-resolution holographic segment, and/or of a low-resolution holographic segment and/or of a stereoscopic segment, which comprises at least one light guiding device and which in particular, in one configuration, uses single-parallax encoding for the encoding of a hologram into the at least one SLM, as represented in FIG. 10.

In general, single-parallax encoding may be used both for the at least one high-resolution holographic segment and for the at least one low-resolution holographic segment. However, for example, a combination is also possible in which the at least one high-resolution holographic segment comprises full-parallax encoding and the at least one low-resolution holographic segment comprises single-parallax encoding.

Figure 9:
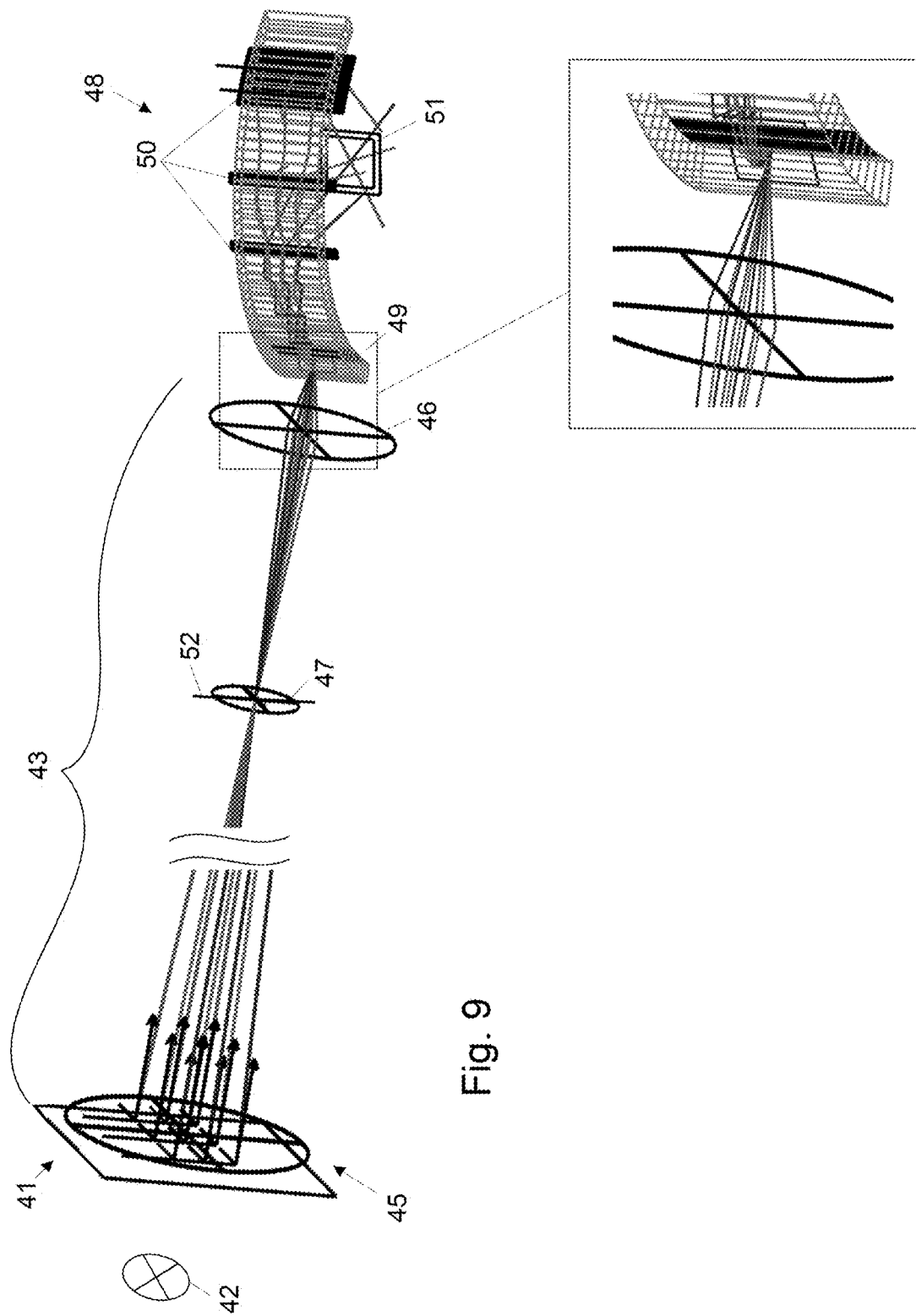
FIG. 9: shows a schematic illustration of a further alternative embodiment of a display device according to the invention, in which a light source image is generated before a light guiding device in the light direction.

Such a display device for a low-resolution holographic segment or optionally also for a stereoscopic segment is represented in FIGS. 9 and 10. Essentially, for a low-resolution holographic segment, FIG. 9 corresponds to a different spatial view of the display device represented in FIG. 7.

FIG. 9 schematically shows a display device comprising an optical system, which comprises a spherical imaging element, in order to generate a two-dimensional light source image for the at least one low-resolution holographic segment or for a stereoscopic segment. In this way, for at least one low-resolution holographic segment or for a stereoscopic segment, both a horizontal coupling angular spectrum and a vertical coupling angular spectrum of the light are generated. The pixels P1 . . . PN which are arranged next to one another, i.e. horizontally next to one another, in the SLM therefore have different horizontal light coupling angles. The pixels P1 . . . PM which are arranged above one another, i.e. vertically next to one another, in the SLM have different vertical light coupling angles.

The display device in this case also comprises an illumination device having at least one light source 42, an SLM 41 and an optical system 43. The optical system 43 comprises the spherical imaging element 46, a field lens 45 and a further imaging element 47. A light guiding device 48 is arranged in the light direction after the optical system 43. In the case of an arrangement having at least one low-resolution holographic segment and at least one high-resolution holographic segment, for example, the spherical imaging element 46 may be configured to be switchable or controllable. It therefore corresponds in this case to the at least one controllable or switchable element 28 in FIGS. 6, 7 and 8. For the low-resolution holographic segment, the spherical imaging element 46 as shown here is switched or controlled in such a way that it corresponds to the function of a spherical lens element which generates a point-like focus, and therefore a two-dimensional light source image, at a light coupling device 49. For example, this spherical lens function may be produced by a controllable lens element, or alternatively also by diffraction gratings arranged perpendicularly to one another, into which two cylindrical lens functions of the same focal length are written.

The same display device could, however, for example also be used in order to generate only one stereoscopic segment. In this case, the spherical imaging element 46 would not need to be configured to be switchable, but instead, for example, may also be configured as one or a combination of a plurality of conventional spherical glass or plastic lens elements.

The light guiding device 48 comprises the light coupling device 49 and a light decoupling device 50. In this case as well, a segment of a field of view is generated in connection with a virtual viewing window 51 in an observer plane by means of the illumination device, the SLM 41, the optical system 43 and the light guiding device 48. Optionally, multiple imaging of the SLM 41 is carried out in order to generate a plurality of segments, which together form a large field of view. The generation of such a segment, whether holographically or stereoscopically, is not intended to be of central importance in FIGS. 9 and 10, and may be carried out according to the disclosures in WO 2018/146326 A2, the disclosure content of WO 2018/146326 A2 also being intended to be fully incorporated here. Rather, the intention being to concentrate on the generation of a light source image in the region of the light coupling into the light guiding device.

In order to generate a two-dimensional light source image, the light emitted by the light source 42 of the illumination device is sent collimated onto the SLM 41, the light then being modulated with the information of a scene to be reconstructed. The modulated light then strikes the field lens 45, which focuses the light coming from all pixels of the SLM 41 into a first light source image in a Fourier plane 52 in which a Fourier transform of the hologram encoded in the SLM 41 is formed. In this Fourier plane 52, in which the first light source image is formed, the further imaging means 47 is arranged, which may be configured as a lens element and may be optional. The Fourier plane 52 may also optionally comprise an aperture, with which filtering of diffraction orders that are formed may be carried out. Both one-dimensional and two-dimensional holograms, which are encoded onto SLMs in pixels, the pixels being regularly arranged, generate a periodic reconstruction in the Fourier plane. In order to suppress or eliminate off the periodicity, it is possible to use the aperture that transmits only the desired periodicity interval, or only the desired diffraction order.

After the first light source image in the Fourier plane 52, the light beams of the individual pixels diverge and strike the spherical imaging element 46. The spherical imaging element 46 focuses the incident light beams in the horizontal direction and in the vertical direction, so that a light source image is generated in the region of the light coupling or before a coupling of the light into the light guiding device 48. The light coupling device 49 of the light guiding device 48 is arranged at or in a region of the position of the light source image in the display device. In this way, a two-dimensional light source image is generated. The generation of the light source image is shown in more detail in the enlarged view of the region of the light coupling into the light guiding device 48.

In FIG. 10 a display device having an optical system is shown, which instead of a spherical imaging element now comprises at least one cylindrical imaging element in order to generate a linear light source image. In this way, for at least one low-resolution holographic segment or for a stereoscopic segment only a horizontal coupling angular spectrum or only a vertical coupling angular spectrum of the light is generated, depending on the orientation of the linear light source image. FIG. 10 shows a vertical linear light source image. Pixels P1 . . . PN which are arranged horizontally next to one another in the SLM therefore have different horizontal light coupling angles. Pixels P1 . . . PM which are arranged vertically above one another in the SLM have equal vertical light coupling angles.

The display device also comprises an illumination device having at least one light source 62, an SLM 61 and the optical system 63. The optical system 63 comprises a pair of crossed cylindrical imaging elements 66 (shown as one element in FIG. 10), a field lens 65 and a further imaging element 67. A light guiding device 68 is arranged in the light direction after the optical system 63. The light guiding device 68 comprises a light coupling device 69 and a light decoupling device 70. In this case as well, a segment of a field of view is generated in connection with a virtual viewing window 71 in an observer plane by means of the illumination device, the SLM 61, the optical system 63 and the light guiding device 68. Optionally, multiple imaging of the SLM 61 is carried out in order to generate a plurality of segments, which together form a large field of view. As already mentioned in relation to FIG. 9, it is not the generation of such a segment that is now of central importance, but rather the generation of a one-dimensional or linear light source image in the region of the light coupling into the light guiding device.

In order to generate a linear light source image, the light emitted by the light source 62 of the illumination device is sent collimated onto the SLM 61, the light then being modulated with the information of a scene to be reconstructed. The modulated light then strikes the field lens 65, with which a first point-like light source image is again generated in a Fourier plane 72 according to FIG. 9. In this Fourier plane 72, in which the first light source image is formed, the further imaging means 67 is arranged, which may be configured as a lens element and may be optional. The Fourier plane 72 may also optionally comprise an aperture, with which filtering of diffraction orders that are formed may be carried out.

After the first light source image in the Fourier plane 72, the light beams of the individual pixels of the SLM 61 diverge and strike the pair of crossed cylindrical imaging elements 66. The pair of crossed cylindrical imaging elements 66 comprises different focal lengths in the horizontal direction and in the vertical direction, and therefore only generates a focus in the region of the light coupling into the light guiding device 68 only in the horizontal direction. A linear light source image is therefore generated in the region of the light coupling or before a coupling of the light into the light guiding device 68. In order to generate at least one high-resolution holographic segment and at least one low-resolution holographic segment, and optionally at least one stereoscopic segment, the pair of crossed cylindrical imaging elements 66 may be configured to be controllable. The adjustment of different focal lengths in order to generate a focus in the region of the light coupling into the light guiding device 68 only in the horizontal direction is then carried out by the switching state or driving state of the pair of crossed cylindrical imaging elements 66 for the at least one low-resolution holographic segment or for the at least one stereoscopic segment. For the at least one high-resolution holographic segment, the pair of crossed cylindrical imaging elements 66 may then have different focal lengths, which in the general case may however also differ in the horizontal direction and in the vertical direction. A further light source image is formed after the light decoupling out of the light guiding device 68 by means of the light decoupling device 70. The light coupling device 69 of the light guiding device 68 is arranged at or in a region of the position of the linear light source image in the display device. The generation of the linear light source image is shown in more detail in the enlarged view of the region of the light coupling into the light guiding device 68.

Both display devices according to FIGS. 9 and 10 may be used in order to generate a decoupling angular spectrum of the light from the light guiding device, which is increased in comparison with the coupling angular spectrum of the light. A coupling angular spectrum of the light is intended to mean the spectrum which is generated at which light beams coming from individual pixels of the SLM strike the light guiding device and are coupled into at different angles on average relative to the surface of the light guiding device. A decoupling angular spectrum of the light is intended to mean the spectrum which is generated at which the light beams propagating in the light guiding device are coupled out of the light guiding device at different angles on average relative to an observer region, which may be understood as a virtual viewing window or also as a sweet spot during the generation of a stereoscopic segment.

In particular, in the display device of FIG. 9, the decoupling angular spectrum of the light may be enlarged both in the horizontal direction and in the vertical direction in comparison with the coupling angular spectrum of the light. However, a field of view that is configured not rectangularly but rather rhombically is formed for an observer.

In the display device of FIG. 10, on the other hand, the decoupling angular spectrum of the light is increased only in the horizontal direction in comparison with the coupling angular spectrum of the light. This is because a large horizontal field of view is particularly important for an observer.

This display device may be combined with other known possibilities for generating an increased vertical field of view.

It is, for example, also possible to use a first light guiding device, rotated through 90 degrees, that comprises for example a plane noncurved light guide. At the coupling of the first light guiding device, a light source image is generated only in the vertical direction. With the first light guiding device, the decoupling angular spectrum from the first light guiding device is increased vertically in comparison with the coupling angular spectrum. The light coupled out of the first light guiding device is focused horizontally by means of a further imaging element onto the light coupling position of a second light guiding device. With the second light guiding device, a decoupling angular spectrum is generated in the horizontal direction which is increased in comparison with the coupling angular spectrum. By the combination of the two light guiding devices, an overall rectangular field of view is then generated.

Further combinations of the embodiments, or exemplary embodiments, are furthermore possible. In conclusion, it should also most particularly be pointed out that the exemplary embodiments described above merely serve to describe the claimed teaching, but this teaching is not intended to be restricted to the exemplary embodiments.

The invention claimed is:

1. A display device for representing two-dimensional and/or three-dimensional objects or scenes, comprising
   at least one illumination device for emitting sufficiently coherent light,
   at least one spatial light modulation device for modulating incident light, and
   at least one optical system, where the at least one optical system is provided for multiple imaging of the at least one spatial light modulation device and for generating virtual viewing windows in accordance with the number of images of the at least one spatial light modulation device, where the individual images of the at least one spatial light modulation device are combined with one another as segments and form a field of view, where the field of view comprises at least one high-resolution holographic segment and at least one low-resolution holographic segment.

2. The display device as claimed in claim 1, wherein the at least one optical system is provided for generating at least one virtual viewing window in combination with the generation of the at least one high-resolution holographic segment, the size of the virtual viewing window of the at least one high-resolution holographic segment being equal to or greater than the size of an eye pupil of an observer observing the object or the scene in the field of view.

3. The display device as claimed in claim 2, wherein the size of the at least one virtual viewing window of the at least one high-resolution holographic segment lies in a range of from 6 mm to 15 mm.

4. The display device as claimed in claim 1, wherein the at least one optical system is provided for generating at least one virtual viewing window in combination with the generation of the at least one low-resolution holographic segment, the size of the virtual viewing window of the at least one low-resolution holographic segment being less than the size of an eye pupil of an observer observing the object or the scene in the field of view.

5. The display device as claimed in claim 4, wherein the size of the at least one virtual viewing window of the at least one low-resolution holographic segment lies in a range of from 0.5 mm to 2 mm.

6. The display device as claimed in claim 1, wherein a plurality of low-resolution holographic segments and/or a plurality of high-resolution holographic segments comprise virtual viewing windows of different size.

7. The display device as claimed in claim 1, wherein the generation of the virtual viewing window of the at least one low-resolution holographic segment and of the virtual viewing window of the at least one high-resolution holographic segment in an observer plane is provided at the same position.

8. The display device as claimed in claim 7, wherein an at least partial overlap of the virtual viewing window of the at least one low-resolution holographic segment with the virtual viewing window of the at least one high-resolution holographic segment is provided.

9. The display device as claimed in claim 1, wherein at least two spatial light modulation devices are provided, one spatial light modulation device being provided for generating the at least one high-resolution holographic segment and the other spatial light modulation device being provided for generating the at least one low-resolution holographic segment.

10. The display device as claimed in claim 9, wherein the one spatial light modulation device for generating the at least one high-resolution holographic segment and the other spatial light modulation device for generating the at least one low-resolution holographic segment are configured differently.

11. The display device as claimed in claim 1, wherein the optical system comprises at least one switchable or controllable element.

12. The display device as claimed in claim 11, wherein the optical system comprises two switchable or controllable optical elements, a first switchable or controllable optical element being switchable or controllable in order to generate the at least one high-resolution holographic segment and a second switchable or controllable optical element being switchable or controllable in order to generate the at least one low-resolution holographic segment.

13. The display device as claimed in claim 1, wherein a hologram in the form of single-parallax encoding is written into the at least one spatial light modulation device in order to generate the at least one high-resolution holographic segment and the at least one low-resolution holographic segment.

14. The display device as claimed in claim 1, wherein a hologram in the form of full-parallax encoding is written into the at least one spatial light modulation device in order to generate the at least one high-resolution holographic segment, and a hologram in the form of single-parallax encoding is written into the at least one spatial light modulation device in order to generate the at least one low-resolution holographic segment.

15. The display device as claimed in claim 1, wherein at least one filter arrangement is provided for eliminating higher diffraction orders present in the observer plane.

16. The display device as claimed in claim 1, wherein a gaze tracking device and at least one tracking device are provided.

17. The display device as claimed in claim 16, wherein the at least one tracking device is provided for tracking the virtual viewing window of the at least one high-resolution holographic segment and/or for tracking the virtual viewing window of the at least one low-resolution holographic segment.

18. The display device as claimed in claim 16, wherein the at least one tracking device is provided for adapting the position of an image of the at least one spatial light modulation device or the position of the at least one high-resolution holographic segment and/or of the at least one low-holographic segment to a focal position and gaze direction of an eye of the observer which are determined by means of the gaze tracking device.

19. The display device as claimed in claim 16, wherein the gaze-tracking device is provided for detecting a pupil position in an eye of an observer and for tracking a gaze of the observer observing the object or the scene.

20. The display device as claimed in claim 1, wherein the field of view comprises the at least one high-resolution holographic segment, the at least one low-resolution holographic segment and at least one stereoscopic segment.

21. The display device as claimed in claim 20, wherein the at least one high-resolution holographic segment, the at least one low-resolution holographic segment and the at least one stereoscopic segment are arranged partially or fully overlapping in the field of view.

22. The display device as claimed in claim 1, wherein at least one light guiding device is provided, which comprises a light guide, at least one light coupling device and at least one light decoupling device, the light propagating inside the light guide by means of reflection at boundary surfaces of the light guide, and the decoupling of the light out of the light guide being provided by means of the light decoupling device after a defined number of reflections of the light at the boundary surfaces of the light guide.

23. The display device as claimed in claim 22, wherein the at least one optical system and the at least one light guiding device are provided for generating at least one high-resolution holographic segment and at least one low-resolution holographic segment and, when required, for generating at least one stereoscopic segment, the high-resolution holographic segment, the low-resolution holographic segment and, when required, the stereoscopic segment together form a field of view, inside which a three-dimensional scene or a three-dimensional object is representable.

24. The display device as claimed in claim 22, wherein imaging of the at least one spatial light modulation device by means of the at least one light guiding device and the at least one optical system is provided.

25. The display device as claimed in claim 22, wherein a light source image of at least one light source provided in the at least one illumination device is provided by means of the optical system in the light path before coupling of the light into the light guiding device.

26. The display device as claimed in claim 25, wherein the at least one light coupling device is provided at or in a region of a position of a light source image.

27. The display device as claimed in claim 22, wherein the optical system comprises two cylindrical optical elements, which are arranged crossed with respect to one another.

28. The display device as claimed in claim 27, wherein the optical system is provided for generating a linear light source image in the light path before coupling of the light into the light guiding device.

29. A method for generating a large field of view, inside which a scene or an object is represented with different resolutions, by means of at least one illumination device, at least one spatial light modulation device and at least one optical system, wherein the at least one spatial light modulation device modulates incident light with required information of the scene or of the object, the at least one optical system multiply images the at least one spatial light modulation device and generates virtual viewing windows in accordance with the number of images of the at least one spatial light modulation device, the individual images of the at least one spatial light modulation device being combined with one another as segments and forming a field of view, at least one high-resolution holographic segment and at least one low-resolution holographic segment being generated for forming the field of view.

30. The method as claimed in claim 29, wherein the generation of the at least one high-resolution holographic segment and of the at least one low-resolution holographic segment is carried out by means of a switchable or a controllable element of the optical system.

31. The method as claimed in claim 30, wherein in that two switchable or controllable optical elements are provided in the optical system, in order to generate the at least one high-resolution holographic segment a first switchable or controllable optical element being switched or controlled and a second switchable or controllable optical element not being switched or controlled, in order to generate the at least one low-resolution holographic segment the second switchable or controllable optical element being switched or controlled and the first switchable or controllable optical element not being switched or controlled.

* * * * *